United States Patent
Mendez Agudelo et al.

(10) Patent No.: US 11,936,002 B2
(45) Date of Patent: *Mar. 19, 2024

(54) ELECTROLYTE COMPOSITION COMPRISING OLIGOMERIC SILYL ESTER PHOSPHONATES

(71) Applicant: BASF SE, Ludwigshafen am Rhein (DE)

(72) Inventors: Manuel Alejandro Mendez Agudelo, Ludwigshafen (DE); Johannes David Hoecker, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 308 days.

This patent is subject to a terminal disclaimer.

(21) Appl. No.: 16/757,547

(22) PCT Filed: Dec. 11, 2018

(86) PCT No.: PCT/EP2018/084385
§ 371 (c)(1),
(2) Date: Apr. 20, 2020

(87) PCT Pub. No.: WO2019/115541
PCT Pub. Date: Jun. 20, 2019

(65) Prior Publication Data
US 2021/0202992 A1   Jul. 1, 2021

(30) Foreign Application Priority Data
Dec. 13, 2017   (EP) .................................... 17206915

(51) Int. Cl.
| | |
|---|---|
| *H01M 10/0567* | (2010.01) |
| *H01G 11/06* | (2013.01) |
| *H01G 11/60* | (2013.01) |
| *H01G 11/62* | (2013.01) |
| *H01G 11/64* | (2013.01) |
| *H01M 10/0525* | (2010.01) |
| *H01M 10/0569* | (2010.01) |
| *H01M 10/052* | (2010.01) |
| *H01M 10/058* | (2010.01) |

(52) U.S. Cl.
CPC ........ *H01M 10/0567* (2013.01); *H01G 11/06* (2013.01); *H01G 11/60* (2013.01); *H01G 11/62* (2013.01); *H01G 11/64* (2013.01); *H01M 10/0525* (2013.01); *H01M 10/0569* (2013.01); *H01M 10/052* (2013.01); *H01M 10/058* (2013.01); *H01M 2300/0028* (2013.01); *H01M 2300/0034* (2013.01)

(58) Field of Classification Search
None
See application file for complete search history.

(56) References Cited

U.S. PATENT DOCUMENTS

| | | | |
|---|---|---|---|
| 8,734,668 B2 | 5/2014 | Bhat et al. | |
| 11,404,723 B2 * | 8/2022 | Hoecker | H01M 10/0567 |
| 2012/0214043 A1 | 8/2012 | Olschimke et al. | |
| 2013/0164604 A1 | 6/2013 | Matsumoto et al. | |
| 2014/0272556 A1 | 9/2014 | Mio et al. | |
| 2016/0027592 A1 | 1/2016 | Shimamoto et al. | |
| 2016/0056503 A1 | 2/2016 | Shatunov et al. | |

FOREIGN PATENT DOCUMENTS

| | | |
|---|---|---|
| EP | 2 573 854 A1 | 3/2013 |
| EP | 2 983 233 A1 | 2/2016 |
| WO | WO 2011/051275 A1 | 5/2011 |
| WO | WO 2013/026854 A1 | 2/2013 |

OTHER PUBLICATIONS

U.S. Appl. No. 16/333,431, filed Mar. 14, 2019, US 2019/0252722 A1, Manuel Alejandro Mendez Agudelo, et al.
U.S. Appl. No. 16/333,619, filed Mar. 15, 2019, US 2019/0252723 A1, Johannes David Hoecker.
U.S. Appl. No. 16/769,414, filed Jun. 3, 2020, Manuel Alejandro Mendez Agudelo, et al.
Extended European Search Report dated June 8, 2018 in Patent Application No. 172069155, 3 pages.
International Preliminary Report on Patentability dated Jun. 16, 2020 in PCT/EP2018/084385 filed Dec. 11, 2018, 6 pages.
Ran Elazari, et al., "Rechargeable Lithiated Silicon-Sulfur (SLS) Battery Prototypes" Electrochemistry Communications, vol. 14, Issue 1, Jan. 2012, pages 21-24.
Kurt Kellner, et al., "Zur Reaktion von Chlorsilanen mit Dialkylphosphonaten" Monatshefte für Chemie, vol. 121, Dec. 1990, pp. 1031-1038.
Robert Rabinowitz, "The Reactions of Phosphonic Acid Esters with Acid Chlorides. A Very Mild Hydrolytic Route" The Journal of Organic Chemistry, vol. 28, Issue 11, Nov. 1963, pp. 2975-2978.
International Search Report dated Feb. 28, 2019 in PCT/EP2018/084385 filed on Dec. 11,2018, 3 pages

* cited by examiner

*Primary Examiner* — Laura Weiner
(74) *Attorney, Agent, or Firm* — Lowenstein Sandler LLP

(57) ABSTRACT

An electrolyte composition containing (i) at least one aprotic organic solvent; (ii) at least one conducting salt; (iii) at least one silyl ester phosphonate containing the structure of formula (I), wherein T is selected from (Ia) and (Ib); and (iv) optionally one or more additives.

11 Claims, No Drawings

ELECTROLYTE COMPOSITION COMPRISING OLIGOMERIC SILYL ESTER PHOSPHONATES

The present invention relates to an electrolyte composition comprising a silyl ester phosphonate containing the structure of formula (I)

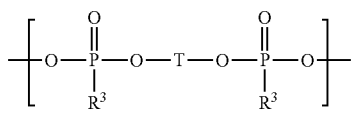

with $R^3$ and T as defined below, to the use of silyl ester phosphonates containing the structure of formula (I) in electrolyte compositions for electrochemical cells and to electrochemical cell comprising said electrolyte composition.

Storing electrical energy is a subject of still growing interest. Efficient storage of electric energy allows electric energy to be generated when it is advantageous and to be used when needed.

Secondary electrochemical cells are well suited for this purpose due to their reversible conversion of chemical energy into electrical energy and vice versa (rechargeability). Secondary lithium batteries are of special interest for energy storage since they provide high energy density and specific energy due to the small atomic weight of the lithium ion, and the high cell voltages that can be obtained (typically 3 to 5 V) in comparison with other battery systems. For that reason, these systems have become widely used as a power source for many portable electronics such as cellular phones, laptop computers, mini-cameras, etc.

In secondary lithium batteries like lithium ion batteries organic carbonates, ethers, esters and ionic liquids are used as sufficiently polar solvents for solvating the conducting salt(s). Most state of the art lithium ion batteries in general comprise not a single solvent but a solvent mixture of different organic aprotic solvents.

Besides solvent(s) and conducting salt(s) an electrolyte composition usually contains further additives to improve certain properties of the electrolyte composition and of the electrochemical cell comprising said electrolyte composition. Common additives are for example flame retardants, overcharge protection additives and film forming additives which react during first charge/discharge cycle on the electrode surface thereby forming a film on the electrode. Different Si- and/or P-containing additives for use in electrolyte compositions are known.

U.S. Pat. No. 8,734,668 B2 describes electrolyte compositions comprising silicon containing compounds which may additionally contain hetero atoms like B, Al, P, S, F, Cl, Br, and I.

EP 2 573 854 A1 discloses electrolyte compositions for use in lithium ion batteries comprising silyl ester group-containing phosphonic acid derivatives to inhibit increase of the battery resistance and deterioration of the battery performance in a high-temperature environment.

US 2013/0164604 A1 refers to the use of phosphite esters, phosphonate esters and bisphosphonate esters as additives in electrolyte compositions for lithium ion batteries.

For increasing the performance of lithium batteries novel cathode active materials are used. These cathode active materials have higher specific energies and/or higher working voltages. Examples of such cathode active materials are high energy NCM (lithiated mixed oxides of Ni, Co and Mn, so-called HE-NCM), high voltage manganese spinels with layer structure containing additional transition metals and lithium nickel cobalt aluminium oxides (also named NCA). For some of these cathode active materials high cut-off voltages have to be used during charging to obtain the desired high specific energies. These cathode active materials place new demands on the electrolyte compositions used, e.g. in regard to stability towards high voltage, $O_2$ release, solvation of transition metal cations leading to metal dissolution, gas evolution upon storage, etc.

There is still the need for improving the performance of electrochemical cells, in particular the performance of electrochemical cells comprising the afore-mentioned cathode materials, e.g. in respect to high capacity retention, good long-term performance, high safety, reduced gas evolution, and decreased impedance build-up.

It is an objective of the present invention to provide additives for use in electrochemical cells to improve the performance of the electrochemical cells, e.g. in respect to high capacity retention, good long-term performance, high safety, reduced gas evolution, and decreased impedance build-up. In particular additives should be provided to improve the performance of electrochemical cells comprising cathode active materials having high specific energies and/or high working voltages. It is another object of the invention to provide electrolyte compositions for electrochemical cells, resulting in electrochemical cells with high capacity retention, good long-term performance and high safety. In particular electrolyte composition for the use with cathode active materials having high specific energies and/or high working voltages should be provided.

It is also an object of the present invention to provide electrochemical cells showing high capacity retention, good long-term performance, high safety, reduced gas evolution, and decreased impedance build-up.

Accordingly, an electrolyte composition is provided, containing
(i) at least one aprotic organic solvent;
(ii) at least one conducting salt;
(iii) at least one silyl ester phosphonate containing the structure of formula (I)

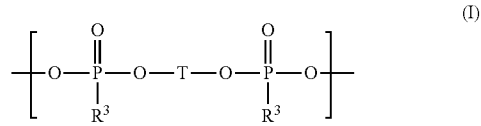

wherein
T is selected from

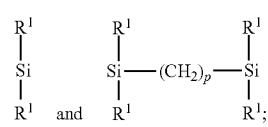

p is an integer from 0 to 6 and one or more $CH_2$ groups of $(CH_2)p$ may be replaced by O and one or more H of $(CH_2)p$ may be replaced by $C_1$-$C_4$ alkyl;
$R^1$ is selected independently at each occurrence from H, F, Cl, $R^4$, $OR^4$, $OSi(R^5)_3$, $OSi(OR^4)_3$, and $OP(O)(OR^4)R^5$;

R$^4$ is independently at each occurrence selected from C$_1$-C$_{10}$ alkyl, C$_3$-C$_7$ (hetero)cycloalkyl, C$_2$-C$_{10}$ alkenyl, C$_2$-C$_{10}$ alkynyl, C$_5$-C$_7$ (hetero)aryl, and C$_6$-C$_{13}$ (hetero)aralkyl which may be substituted by one or more substituents selected from CN and F and wherein one or more CH$_2$-groups of alkyl, alkenyl and alkynyl which are not directly bound to the Si-atom or the O-atom may be replaced by O;

R$^3$ and R$^5$ are selected independently at each occurrence from H, F, C$_1$-C$_{10}$ alkyl, C$_3$-C$_7$ (hetero)cycloalkyl, C$_2$-C$_{10}$ alkenyl, C$_2$-C$_{10}$ alkynyl, C$_5$-C$_7$ (hetero)aryl, and C$_6$-C$_{13}$ (hetero)aralkyl which may be substituted by one or more substituents selected from CN and F and wherein one or more CH$_2$-groups of alkyl, alkenyl and alkynyl which are not directly bound to the P-atom may be replaced by O; and (iv) optionally one or more additives.

Additionally, the use of silyl ester phosphonates containing a unit of formula (I) in electrochemical cells, e.g. as additive in electrolyte compositions for electrochemical cells and electrochemical cells comprising said electrolyte composition are provided. The electrochemical cells according to the invention exhibit good capacity retention, good long-term performance, decreased cell resistance and reduced gas generation during storage at elevated temperatures. The silyl ester phosphonates containing a unit of formula (I) are non-volatile under the conditions during preparation, storing and using the electrochemical cells, which facilitates the handling and storage of the electrolyte compositions.

In the Following the Invention is Described in Detail.

Viewed chemically, an electrolyte composition is any composition that comprises free ions and as a result is electrically conductive. The electrolyte composition functions as a medium that transfers ions participating in the electrochemical reactions taking place in an electrochemical cell. In case of a lithium battery the ion participating in the electrochemical reaction is usually the lithium ion. The most common electrolyte composition is an ionic solution, although molten electrolyte compositions and solid electrolyte compositions are likewise possible. An electrolyte composition of the invention is therefore an electrically conductive medium, primarily due to the presence of at least one substance which is present in a dissolved and/or molten state, i.e., an electrical conductivity supported by movement of ionic species. In liquid or gel electrolyte compositions the conducting salt is usually solvated in one or more aprotic organic solvents.

The electrolyte composition contains at least one aprotic organic solvent (i). The at least one aprotic organic solvent may be selected from optionally fluorinated aprotic organic solvents, i.e. from fluorinated and non-fluorinated aprotic organic solvents. The electrolyte composition may contain a mixture of fluorinated and non-fluorinated aprotic organic solvents.

The aprotic organic solvent is preferably selected from optionally fluorinated cyclic and acyclic organic carbonates, optionally fluorinated acyclic ethers and polyethers, optionally fluorinated cyclic ethers, optionally fluorinated cyclic and acyclic acetales and ketales, optionally fluorinated orthocarboxylic acids esters, optionally fluorinated cyclic and acyclic esters and diesters of carboxylic acids, optionally fluorinated cyclic and acyclic sulfones, optionally fluorinated cyclic and acyclic nitriles and dinitriles and optionally fluorinated cyclic and acyclic phosphates and mixtures thereof.

Examples of optionally fluorinated cyclic carbonates are ethylene carbonate (EC), propylene carbonate (PC) and butylene carbonate (BC), wherein one or more H may be substituted by F and/or an C$_1$ to C$_4$ alkyl group, e.g. 4-methyl ethylene carbonate, monofluoroethylene carbonate (FEC), and cis- and trans-difluoroethylene carbonate. Preferred optionally fluorinated cyclic carbonates are ethylene carbonate, monofluoroethylene carbonate, and propylene carbonate, in particular ethylene carbonate.

Examples of optionally fluorinated acyclic carbonates are di-C$_1$-C$_{10}$-alkylcarbonates, wherein each alkyl group is selected independently from each other and wherein one or more H may be substituted by F. Preferred are optionally fluorinated di-C$_1$-C$_4$-alkylcarbonates. Examples are e.g. diethyl carbonate (DEC), ethyl methyl carbonate (EMC), 2,2,2-trifluoroethyl methyl carbonate (TFEMC), dimethyl carbonate (DMC), trifluoromethyl methyl carbonate (TFMMC), and methylpropyl carbonate. Preferred acyclic carbonates are diethyl carbonate (DEC), ethyl methyl carbonate (EMC), and dimethyl carbonate (DMC).

In one embodiment of the invention the electrolyte composition contains mixtures of optionally fluorinated acyclic organic carbonates and cyclic organic carbonates at a ratio by weight of from 1:10 to 10:1, preferred of from 3:1 to 1:1.

Examples of optionally fluorinated acyclic ethers and polyethers are optionally fluorinated di-C$_1$-C$_{10}$-alkylethers, optionally fluorinated di-C$_1$-C$_4$-alkyl-C$_2$-C$_6$-alkylene ethers, optionally fluorinated polyethers, and fluorinated ethers of formula R'—(O—CF$_r$H$_{2-r}$)$_q$—R" wherein R' is a C$_1$-C$_{10}$ alkyl group or a C$_3$-C$_{10}$ cycloalkyl group, wherein one or more H of an alkyl and/or cycloalkyl group are substituted by F; R" is H, F, a C$_1$-C$_{10}$ alkyl group, or a C$_3$-C$_{10}$ cycloalkyl group, wherein one or more H of an alkyl and/or cycloalkyl group are substituted by F; r is 1 or 2; and q is 1, 2 or 3.

According to the invention each alkyl group of the optionally fluorinated di-C$_1$-C$_{10}$-alkylethers is selected independently from the other wherein one or more H of an alkyl group may be substituted by F. Examples of optionally fluorinated di-C$_1$-C$_{10}$-alkylethers are dimethylether, ethylmethylether, diethylether, methylpropylether, diisopropylether, di-n-butylether, 1,1,2,2-tetrafluo-roethyl-2,2,3,3-tetrafluoropropyl ether (CF$_2$HCF$_2$CH$_2$OCF$_2$CF$_2$H), and 1 H,1 H,5H-perfluoropentyl-1,1,2,2-tetrafluoroethylether (CF$_2$H(CF$_2$)$_3$CH$_2$OCF$_2$CF$_2$H).

Examples of optionally fluorinated di-C$_1$-C$_4$-alkyl-C$_2$-C$_6$-alkylene ethers are 1,2-dimethoxye-thane, 1,2-diethoxyethane, diglyme (diethylene glycol dimethyl ether), triglyme (triethyleneglycol dimethyl ether), tetraglyme (tetraethyleneglycol dimethyl ether), and diethylenglycoldiethylether.

Examples of suitable optionally fluorinated polyethers are polyalkylene glycols wherein one or more H of an alkyl or alkylene group may be substituted by F, preferably poly-C$_1$-C$_4$-alkylene glycols and especially polyethylene glycols. Polyethylene glycols may comprise up to 20 mol % of one or more C$_1$-C$_4$-alkylene glycols in copolymerized form. Polyalkylene glycols are preferably dimethyl- or diethyl-end-capped polyalkylene glycols. The molecular weight M$_W$ of suitable polyalkylene glycols and especially of suitable polyethylene glycols may be at least 400 g/mol. The molecular weight M$_W$ of suitable polyalkylene glycols and especially of suitable polyethylene glycols may be up to 5 000 000 g/mol, preferably up to 2 000 000 g/mol.

Examples of fluorinated ethers of formula R'—(O—CF$_p$H$_{2-p}$)$_q$—R" are 1,1,2,2-tetrafluoroethyl-2,2,3,3-tetrafluoropropyl ether (CF$_2$HCF$_2$CH$_2$OCF$_2$CF$_2$H), and 1H,1H,5H-perfluoropentyl-1,1,2,2-tetrafluoroethylether ($CF_2H(CF_2)_3CH_2OCF_2CF_2H$).

Examples of optionally fluorinated cyclic ethers are 1,4-dioxane, tetrahydrofuran, and their derivatives like 2-methyl tetrahydrofuran wherein one or more H of an alkyl group may be substituted by F.

Examples of optionally fluorinated acyclic acetals are 1,1-dimethoxymethane and 1,1-diethoxymethane. Examples of cyclic acetals are 1,3-dioxane, 1,3-dioxolane, and their derivatives such as methyl dioxolane wherein one or more H may be substituted by F.

Examples of optionally fluorinated acyclic orthocarboxylic acid esters are tri-$C_1$-$C_4$ alkoxy methane, in particular trimethoxymethane and triethoxymethane. Examples of suitable cyclic orthocarboxylic acid esters are 1,4-dimethyl-3,5,8-trioxabicyclo[2.2.2]octane and 4-ethyl-1-methyl-3,5,8-trioxabicyclo[2.2.2]octane wherein one or more H may be substituted by F.

Examples of optionally fluorinated acyclic esters of carboxylic acids are ethyl and methyl formiate, ethyl and methyl acetate, ethyl and methyl proprionate, and ethyl and methyl butanoate, and esters of dicarboxylic acids like 1,3-dimethyl propanedioate wherein one or more H may be substituted by F. An example of a cyclic ester of carboxylic acids (lactones) is γ-butyrolactone.

Examples of optionally fluorinated cyclic and acyclic sulfones are ethyl methyl sulfone, dimethyl sulfone, and tetrahydrothiophene-S,S-dioxide (sulfolane).

Examples of optionally fluorinated cyclic and acyclic nitriles and dinitriles are adipodinitrile, acetonitrile, propionitrile, and butyronitrile wherein one or more H may be substituted by F.

Examples of optionally fluorinated cyclic and acyclic phosphates are trialkyl phosphates wherein one or more H of an alkyl group may be substituted by F like trimethyl phosphate, triethyl phosphate, and tris(2,2,2-trifluoroethyl) phosphate.

More preferred the aprotic organic solvent(s) are selected from optionally fluorinated ethers and polyethers, optionally fluorinated cyclic and acyclic organic carbonates, optionally fluorinated cyclic and acyclic esters and diesters of carboxylic acids and mixtures thereof. Even more preferred the aprotic organic solvent(s) are selected from optionally fluorinated ethers and polyethers, and optionally fluorinated cyclic and acyclic organic carbonates, and mixtures thereof.

According to one embodiment the electrolyte composition contains at least solvent selected from fluorinated ethers and polyethers, e.g. compounds of formula fluorinated ethers of formula R'—(O—$CF_pH_{2-p}$)$_q$—R'' as defined above like $CF_2HCF_2CH_2OCF_2CF_2H$ or $CF_2H(CF_2)_3CH_2OCF_2CF_2H$.

According to another embodiment, the electrolyte composition contains at least one solvent selected from fluorinated cyclic carbonate like 1-fluoro ethyl carbonate.

According to a further embodiment the electrolyte composition contains at least one solvent selected from fluorinated cyclic carbonate, e.g. 1-fluoro ethyl carbonate, and at least one solvent selected from fluorinated ethers and polyethers, e.g. compounds of formula fluorinated ethers of formula R'—(O—$CF_rH_{2-r}$)$_s$—R'' as defined above like $CF_2HCF_2CH_2OCF_2CF_2H$ or $CF_2H(CF_2)_3CH_2OCF_2CF_2H$.

According to another embodiment the electrolyte composition contains at least one fluorinated cyclic carbonate, e.g. 1-fluoro ethyl carbonate and at least one non-fluorinated acyclic organic carbonate, e.g. dimethyl carbonate, diethyl carbonate or ethyl methyl carbonate.

The electrolyte composition contains at least one conducting salt (ii). The electrolyte composition functions as a medium that transfers ions participating in the electrochemical reaction taking place in an electrochemical cell. The conducting salt(s) (ii) present in the electrolyte composition are usually solvated in the aprotic organic solvent(s) (i). Preferably the at least one conducting salt (ii) is selected from lithium salts. Examples of lithium ion containing conducting salts are Li[$F_{6-x}P(C_yF_{2y+1})_x$], wherein x is an integer in the range from 0 to 6 and y is an integer in the range from 1 to 20; Li[B($R^I$)$_4$], Li[B($R^I$)$_2$(O$R^{II}$O)] and Li[B(O$R^{II}$O)$_2$] wherein each $R^I$ is independently from each other selected from F, Cl, Br, I, $C_1$-$C_4$ alkyl, $C_2$-$C_4$ alkenyl, $C_2$-$C_4$ alkynyl, O$C_1$-$C_4$ alkyl, O$C_2$-$C_4$ alkenyl, and O$C_2$-$C_4$ alkynyl wherein alkyl, alkenyl, and alkynyl may be substituted by one or more O$R^{III}$, wherein $R^{III}$ is selected from $C_1$-$C_6$ alkyl, $C_2$-$C_6$ alkenyl, and $C_2$-$C_6$ alkynyl, and (O$R^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

$LiClO_4$; $LiAsF_6$; $LiCF_3SO_3$; $Li_2SiF_6$; $LiSbF_6$; $LiAlCl_4$, Li(N($SO_2F$)$_2$), lithium tetrafluoro (oxalato) phosphate; lithium oxalate; and salts of the general formula Li[Z($C_nF_{2n+1}SO_2$)$_m$], where m and n are defined as follows:

m=1 when Z is selected from oxygen and sulfur, m=2 when Z is selected from nitrogen and phosphorus, m=3 when Z is selected from carbon and silicon, and n is an integer in the range from 1 to 20.

Suited 1,2- and 1,3-diols from which the bivalent group (O$R^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (O$R^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (O$R^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B($R^I$)$_4$], Li[B($R^I$)$_2$(O$R^{II}$O)$_2$] and Li[B(O$R^{II}$O)$_2$] are $LiBF_4$, lithium difluoro oxalato borate and lithium dioxalato borate.

Preferably the at least one lithium ion containing conducting salt is selected from $LiPF_6$, $LiAsF_6$, $LiSbF_6$, $LiCF_3SO_3$, $LiBF_4$, lithium bis(oxalato) borate, $LiClO_4$, LiN ($SO_2C_2F_5$)$_2$, $LiN(SO_2CF_3)_2$, $LiN(SO_2F)_2$, and $LiPF_3(CF_2CF_3)_3$, more preferred the conducting salt is selected from $LiPF_6$, $LiN(SO_2F)_2$, and $LiBF_4$, and the most preferred conducting salt is $LiPF_6$.

The conducting salt(s) (ii) are usually present at a minimum concentration of at least 0.1 mol/l, preferably the concentration of the ion containing conducting salt(s) is 0.5 to 2 mol/l based on the entire electrolyte composition.

The electrolyte composition contains at least one silyl ester phosphonate containing the structure of formula (I)

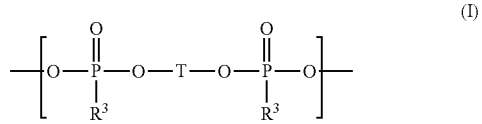

wherein
T is selected from

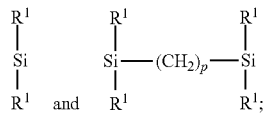

p is an integer from 0 to 6 and one or more $CH_2$ groups of $(CH_2)_p$ may be replaced by O and one or more H of $(CH_2)_p$ may be replaced by $C_1$-$C_4$ alkyl;

$R^1$ is selected independently at each occurrence from H, F, Cl, $R^4$, $OR^4$, $OSi(R^5)_3$, $OSi(OR^4)_3$, and $OP(O)(OR^4)R^5$;

$R^4$ is independently at each occurrence selected from $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the Si-atom or the O-atom may be replaced by O;

$R^3$ and $R^5$ are selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the P-atom may be replaced by O.

The silyl ester phosphonates containing the structure of formula (I) are also referred to as com-ponent (iii) of the electrolyte composition.

The term "$C_1$-$C_{10}$ alkyl" as used herein means a straight or branched saturated hydrocarbon group with 1 to 10 carbon atoms having one free valence, e.g., methyl, ethyl, n-propyl, isopropyl, n-butyl, isobutyl, tert-butyl, n-pentyl, iso-pentyl, 2,2-dimethylpropyl, n-hexyl, 2-ethyl hexyl, n-heptyl, iso-heptyl, n-octyl, iso-octyl, n-nonyl, n-decyl, and the like. Preferred are $C_1$-$C_6$ alkyl, more preferred are $C_1$-$C_4$ alkyl, even more preferred are methyl, ethyl, and n- and isopropyl and most preferred are methyl and ethyl.

The term "$C_3$-$C_7$ (hetero)cycloalkyl" as used herein means a saturated 3- to 7-membered hydrocarbon cycle having one free valence wherein one or more of the C-atoms of the saturated cycle may be replaced independently from each other by a heteroatom selected from N, S, O and P. Examples of $C_3$ to $C_7$ cycloalkyl include cyclopropyl, cyclobutyl, cyclopentyl, and cyclohexyl, preferred is cyclohexyl. Examples of $C_3$ to $C_7$ hetero cycloalkyl are oxiranyl, tetrahydrofuryl, pyrrolidyl, piperidyl and morpholinyl.

The term "$C_2$-$C_{10}$ alkenyl" as used herein refers to an unsaturated straight or branched hydrocarbon group with 2 to 10 carbon atoms having one free valence. Unsaturated means that the alkenyl group contains at least one C—C double bond. $C_2$-$C_{10}$ alkenyl includes for example ethenyl, propenyl, 1-n-butenyl, 2-n-butenyl, iso-butenyl, 1-pentenyl, 1-hexenyl, 1-heptenyl, 1-octenyl, 1-nonenyl, 1-decenyl, and the like. Preferred are $C_2$ to $C_6$ alkenyl groups, even more preferred are $C_2$-$C_4$ alkenyl groups, more preferred are ethenyl and propenyl, most preferred is 1-propen-3-yl, also called allyl.

The term "$C_2$ to $C_{10}$ alkynyl" as used herein refers to an unsaturated straight or branched hydrocarbon group with 2 to 10 carbon atoms having one free valence, wherein the hydrocarbon group contains at least one C—C triple bond. $C_2$-$C_6$ alkynyl includes for example ethynyl, propynyl, 1-n-butinyl, 2-n-butynyl, iso-butinyl, 1-pentynyl, 1-hexynyl, 1-heptynyl, 1-octynyl, 1-nonynyl, 1-decynyl, and the like. Preferred are $C_2$ to $C_6$ alkynyl, even more preferred are $C_2$-$C_4$ alkynyl, more preferred are ethynyl and 1-propyn-3-yl (propargyl).

The term "$C_5$ to $C_7$ (hetero)aryl" as used herein denotes an aromatic 5- to 7-membered hydrocarbon cycle or condensed cycles having one free valence wherein one or more of the C-atoms of the aromatic cycle(s) may be replaced independently from each other by a heteroatom selected from N, S, O and P. Examples of $C_5$-$C_7$ (hetero)aryl are pyrrolyl, furanyl, thiophenyl, pyridinyl, pyranyl, thiopyranyl, and phenyl. Preferred is phenyl.

The term "$C_6$-$C_{13}$ (hetero)aralkyl" as used herein denotes an aromatic 5- to 7-membered hydrocarbon cycle substituted by one or more $C_1$-$C_6$ alkyl wherein one or more of the C-atoms of the aromatic cycle may be replaced independently from each other by a heteroatom selected from N, S, O and P. The $C_6$-$C_{13}$ (hetero)aralkyl group contains in total 6 to 13 C- and heteroatoms and has one free valence. The free valence may be located in the aromatic cycle or in a $C_1$-$C_6$ alkyl group, i.e. $C_6$-$C_{13}$ (hetero)aralkyl group may be bound via the (hetero)aromatic part or via the alkyl part of the group. Examples of $C_6$-$C_{13}$ (hetero)aralkyl are methylphenyl, 2-methylpyridyl, 1,2-dimethylphenyl, 1,3-dimethylphenyl, 1,4-dimethylphenyl, ethylphenyl, 2-propylphenyl, benzyl, 2-$CH_2$-pyridyl, and the like.

$R^1$ is selected independently at each occurrence from H, F, Cl, $R^4$, $OR^4$, $OSi(R^5)_3$, $OSi(OR^4)_3$, and $OP(O)(OR^4)R^5$,
$R^4$ is independently at each occurrence selected from $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the Si-atom or the O-atom may be replaced by O. Preferably $R^4$ is independently at each occurrence selected from $C_1$-$C_{10}$ alkyl, which may be substituted by one or more substituents selected from CN and F and wherein one or more $CH_2$-groups of alkyl, alkenyl and alkynyl which are not directly bound to the Si-atom or the O-atom may be replaced by O, more preferred $R^4$ is independently at each occurrence selected from $C_1$-$C_4$ alkyl, which may be substituted by one or more substituents selected from CN and F. For example, $R^4$ may be selected from methyl, ethyl, n-propyl, i-propyl, phenyl, cyclohexyl, $CF_3$, $CF_2CF_3$ or $CH_2CN$.

$R^5$ is selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)

aralkyl which may be substituted by one or more substituents selected from CN and F and wherein one or more $CH_2$-groups of alkyl, alkenyl and alkynyl which are not directly bound to the P-atom may be replaced by O, preferably $R^5$ is selected independently at each occurrence from H, F, and $C_1$-$C_{10}$ alkyl, which may be substituted by one or more F and/or CN and wherein one or more $CH_2$-groups of alkyl which are not directly bound to the P-atom may be replaced by O, more preferred $R^5$ is selected independently at each occurrence from H and $C_1$-$C_{10}$ alkyl, which may be substituted by one or more F and/or CN, even more preferred $R^5$ is selected independently at each occurrence from H and $C_1$-$C_4$ alkyl, which may be substituted by one or more F and/or CN. For example, $R^5$ may be selected from H, F, methyl, ethyl, n-propyl, i-propyl, phenyl, cyclohexyl, $CF_3$, $CF_2CF_3$ or $CH_2CN$.

Preferably $R^1$ is selected independently at each occurrence from H, F, Cl, $C_1$-$C_{10}$ alkyl, and $OC_1$-$C_{10}$ alkyl, wherein alkyl may be substituted by one or more substituents selected from CN and F and wherein one or more $CH_2$-groups of alkyl which are not directly bound to the Si-atom or 0-atom may be replaced by O, even more preferred $R^1$ is selected independently from $C_1$-$C_{10}$ alkyl which may be substituted by one or more substituents selected from CN and F, in particular preferred $R^1$ is selected independently from $C_1$-$C_4$ alkyl which may be substituted by one or more substituents selected from CN and F. $R^1$ is for example selected independently at each occurrence from H, F, Cl, methyl, methoxy, ethyl, ethoxy, n-propyl, n-propoxy, i-propyl, i-propoxy, phenyl, phenoxy, $CF_3$, $OCF_3$, $CF_2CF_3$, $OCF_2CF_3$, and $CH_2CN$, preferably are selected from methyl, ethyl, i-propyl and n-propyl.

$R^3$ is selected independently at each occurrence from H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to the P-atom may be replaced by O, preferably $R^3$ is selected independently at each occurrence from H, F, $C_1$-$C_{10}$ alkyl, $C_3$-$C_7$ (hetero)cycloalkyl, and $C_5$-$C_7$ (hetero)aryl, which may be substituted by one or more substituents selected from CN and F and wherein one or more $CH_2$-groups of alkyl, alkenyl and alkynyl which are not directly bound to the P-atom may be replaced by O, more preferred $R^3$ is selected independently at each occurrence from H, F, and $C_1$-$C_{10}$ alkyl, which may be substituted by one or more F and/or CN and wherein one or more $CH_2$-groups of alkyl which are not directly bound to the P-atom may be replaced by O, and even more preferred $R^3$ is selected independently at each occurrence from H and $C_1$-$C_{10}$ alkyl, which may be substituted by one or more F and/or CN and wherein one or more $CH_2$-groups of alkyl which are not directly bound to the P-atom may be replaced by O. Most preferred $R^3$ is selected independently at each occurrence from H and $C_1$-$C_4$ alkyl, which may be substituted by one or more F and/or CN. $R^3$ may for example be selected from H, F, methyl, ethyl, n-propyl, i-propyl, cyclohexyl, phenyl, $CF_3$, $CF_2CF_3$, $CH_2CH_2OCH_3$, $CH_2CH_2OCH_3$, and $CH_2CN$. In particular preferred is $R^3$ being H.

T is selected from

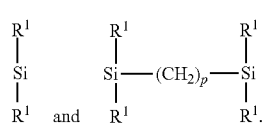

p is an integer from 0 to 6 and may be 1, 2, 3, 4, 5 or 6. One or more $CH_2$ groups of $(CH_2)p$ may be replaced by O, resulting e.g. in $CH_2$—O—$CH_2$ or $CH_2$—O—$CH_2$—O—$CH_2$. In case more than one $CH_2$ group is replaced by O, the $CH_2$ groups replaced by O are not adjacent. One or more H of $(CH_2)p$ may be replaced by $C_1$-$C_4$ alkyl. Examples for $(CH_2)p$ wherein one or more H are replaced by $C_1$-$C_4$ alkyl are $C(CH_3)H$, $C(CH_3)_2$, $C(CH_3)HCH_2$, $C(CH_3)HC(CH_3)H$, and $C(CH_3)HC(C_2H_4)H$.

Examples of structures of formula (I) are the following structures (1.1) to (1.5)

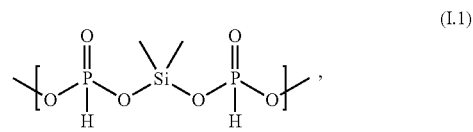
(I.1)

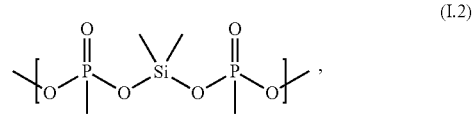
(I.2)

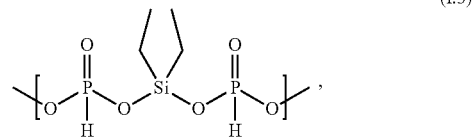
(I.3)

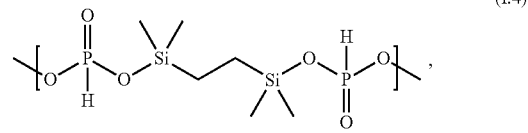
(I.4)

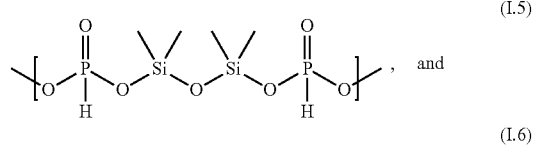
(I.5) and

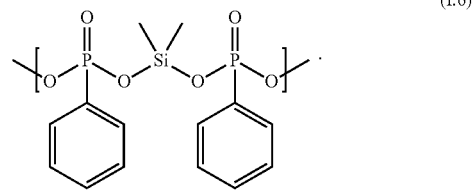
(I.6)

Preferably the silyl ester phosphonate containing the structure of formula (I) are terminated by phosphonate groups selected from —P(O)$R^3$—$OC_1$-$C_6$ alkyl, more preferred by phosphonate groups selected from —P(O)$R^3$—$OC_1$-$C_4$ alkyl and in particular preferred by phosphonate groups selected from —P(O)$R^3$—$OCH_3$ and —P(O)$R^3$—$OCH_2CH_3$.

According to one embodiment the silyl ester phosphonate contains the structure of formula (II)

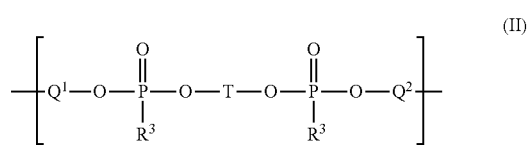
(II)

wherein

Q¹ is a chemical bond or a monomeric or oligomeric group containing one or more monomeric units of formula (II.1) and Q² is a chemical bond or a monomeric or oligomeric group containing one or more monomeric units of formula (II.2)

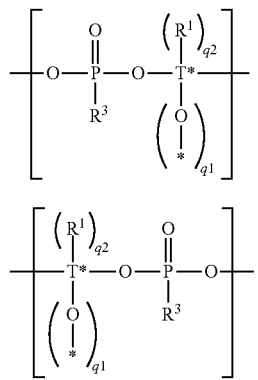

wherein

T* is independently at each occurrence Si or Si—(CH$_2$)$_p$—Si, wherein p is an integer of 0 to 6, i.e. p is selected from 0, 1, 2, 3, 4, 5, and 6, and one or more CH$_2$ groups of (CH$_2$)$_p$ may be replaced by O and one or more H of (CH$_2$)$_p$ may be replaced by C$_1$-C$_4$ alkyl, and in case T* is Si, q¹ is an integer from zero to 2, q² is an integer from zero to 2 and q¹+q²=2, i.e. q¹ and q² are selected from 0, 1, and 2 wherein q¹+q²=2;

in case T* is Si—(CH$_2$)$_p$—Si, q¹ is an integer from zero to 4, q² is an integer from zero to 4 and q¹+q²=4, i.e. q¹ and q² are selected from 0, 1, 2, 3, and 4 wherein q¹+q²=4;

—* is a continuation of the silylester phosphonate backbone by branching; and

R¹ and R³ are defined as described above and as described as preferred.

Examples of Q¹ are

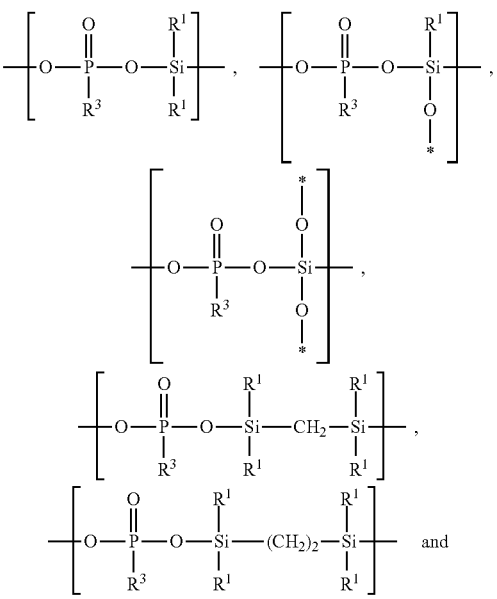

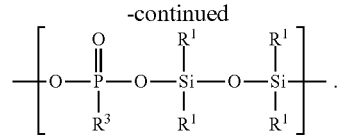

Examples of Q² are

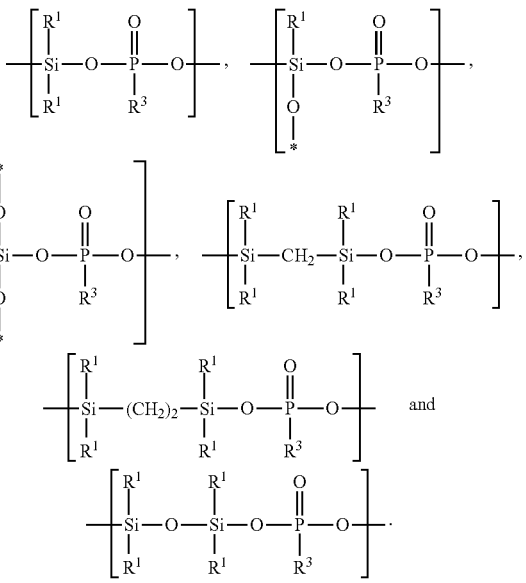

The monomeric units of Q¹ and Q² may be arranged in any way, e.g. randomly or in blocks or in alternating order.

Preferably Q¹ and/or Q² comprise at least one monomeric unit of formula (II.1) or of formula (II.2), respectively, which is no branching or crosslinking unit, i.e. wherein T* is independently at each occurrence Si or Si—(CH$_2$)$_p$—Si and p is an integer of 0 to 6 and one or more CH$_2$ groups of (CH$_2$)$_p$ may be replaced by O and one or more H of (CH$_2$)$_p$ may be replaced by C$_1$-C$_4$ alkyl, and wherein in case T* is Si, q¹ is zero and q² is 2, and in case T* is Si—(CH$_2$)$_p$—Si, q¹ is zero and q² is 4.

According to another embodiment the silyl ester phosphonate has the formula (III)

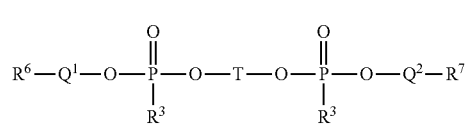

wherein

Q¹, Q², T and R³ are defined as described above;

R⁶ and R⁷ are selected independently from R⁸, Si(OR⁸)$_3$ and Si(R⁹)$_3$;

R⁸ is selected independently at each occurrence from C$_1$-C$_{10}$ alkyl, C$_3$-C$_7$ (hetero)cycloalkyl, C$_2$-C$_{10}$ alkenyl, C$_2$-C$_{10}$ alkynyl, C$_5$-C$_7$ (hetero)aryl, and C$_6$-C$_{13}$ (hetero)aralkyl which may be substituted by one or more substituents selected from CN and F and wherein one or more CH$_2$-groups of alkyl, alkenyl and alkynyl which are not directly bound to an O- or an Si-atom may be replaced by O; and $R^9$ is selected independently at each occurrence from H, F, Cl, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl which may be substituted by one or more substituents selected from CN and F and wherein one or more $CH_2$-groups of alkyl, alkenyl and alkynyl which are not directly bound to an O-atom may be replaced by O.

It is preferred that $R^6$ and $R^7$ are independently selected from $C_1$-$C_{10}$ alkyl, Si(O$C_1$-$C_{10}$ alkyl)$_3$ and Si($R^9$)$_3$ wherein $R^9$ is selected independently at each occurrence from H, F, Cl, and $C_1$-$C_{10}$ alkyl, more preferred $R^9$ is selected from H, F, Cl and $C_1$-$C_4$ alkyl. $R^6$ and $R^7$ may e.g. be selected from methyl, ethyl, n-propyl, i-propyl, Si(CH$_3$)$_3$, Si(OCH$_3$)$_3$, Si(CH$_3$)$_2$Cl and Si(CH$_3$)Cl$_2$. It is even more preferred that $R^6$ and $R^7$ are independently selected from $C_1$-$C_4$ alkyl, i.e. the silyl ester phosphonates are terminated by alkoxy groups like methoxy, ethoxy, n-propoxy and n-butoxy, in particularly preferred are methoxy and ethoxy terminated silyl ester phosphonates.

In particular the silyl ester phosphonate may have the formula (IV)

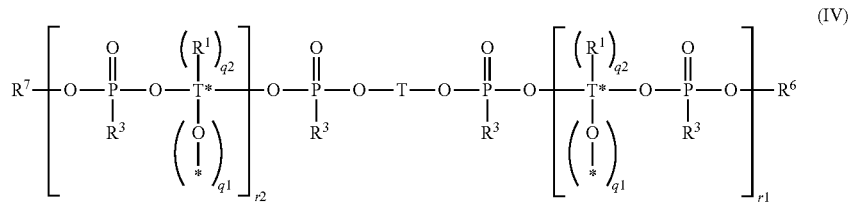

wherein
$R^1$, $R^3$, $R^6$, $R^7$, T, T*, $q^1$ and $q^2$ are defined as above and as preferred; and
$r^1$ and $r^2$ are independently integers from 0 to 300.

According to one embodiment of the invention the silyl ester phosphonates containing the structure of formula (I) are used as mixtures of different silyl ester phosphonates with different molecular weights, in particular as mixtures of a monomeric silyl ester phosphonate containing the structure of formula (I) which does not contain a repeating monomeric unit and at least one oligomeric or polymeric silyl ester phosphonate which contains the structure of formula (I) and one or more repeating monomeric units, e.g. a mixture of a compound of formula (IV) wherein $r^1$ and $r^2$ are both zero and at least one oligomeric or polymeric silyl ester phosphonate of formula (IV) wherein $r^1$+$r^2$>1.

The preparation of similar silyl ester phosphonates containing the structure of formula (I) is known to the person skilled in the art, see e.g. K. Kellner, L. Rodewald, Monatshefte for Chemie, Vol. 121 (1990), pages 1031 to 1038. The oligomeric silyl ester phosphonates used according to the invention may be prepared in analogy. Depending on the starting materials linear compounds or compounds with branching points or crosslinking function are obtainable. E.g. the reaction of (CH$_3$)$_2$SiCl$_2$ with dimethyl phosphite will result in linear silylester phosphonates. In case a portion of (CH$_3$)$_2$SiCl$_2$ is substituted by (CH$_3$)SiCl$_3$ or SiCl$_4$ monomeric units are intro-duced into the silylester phosphonates which function as branching or crosslinking points. Furthermore (CH$_3$)$_2$SiCl$_2$ can be substituted by alkyliden spaced dichloro disilanes e.g. Cl(CH$_3$)$_2$Si(CH$_2$)$_2$Si(CH$_3$)$_2$Cl. Depending on the starting compounds, the molar ratios and the reaction conditions different silyl ester phosphonates and often mixtures of monomeric silylester phosphonate and one or more oligomeric and polymeric silyl ester phosphonates with different molecular weights are obtained.

Another aspect of the present invention is the use of the silyl ester phosphonates containing the structure of formula (I) in electrolyte compositions for electrochemical cells, e.g. in lithium ion capacitors, double layer capacitors and lithium batteries, in particular in secondary lithium batteries as described below. The silyl ester phosphonate containing the structure of formula (I) are expecially suited as cathode active additives capable of interacting with the cathode at the cath-ode-electrolyte interface thereby reducing undesired reactions of the cathode active material with the electrolyte composition, e.g. inhibiting direct contact of components of the electrolyte composition with the cathode active material by forming a film on the cathode or by inhibiting the formation of electrolyte decomposition products detrimental for the cell operation (e.g. HF). The direct contact of electrolyte composition with the cathode often leads to decomposition reactions.

The silyl ester phosphonates containing the structure of formula (I) can also be used as additives for reducing gas generation in electrolyte compositions for electrochemical cells, e.g. in lithium ion capacitors, double layer capacitors and lithium batteries, in particular in secondary lithium batteries as described below. Undesired generation of gas within an electrochemical cell is a safety issue since the increase of the internal pressure may lead to leakage of the cell and loss of electrolyte composition increasing the possibility of ignition and emission of unhealthy compounds.

The silyl ester phosphonate containing the structure of formula (I) are usually used in the electrolyte compositions in the concentrations given below for the electrolyte compositions by adding the desired amounts of the compound(s) of formula (I) to the electrolyte composition. Depending on the molecular weight and the presence of branching/crosslinking units the silyl ester phosphonates may be dissolved or swollen in the non-aqueous solvent(s) (ii).

The electrolyte composition may contain one silyl ester phosphonate containing the structure of formula (I), it may contain more than one silyl ester phosphonate containing the structure of formula (I), e.g. two, three or more.

Usually the electrolyte composition contains in total at least 0.01 wt.-% of the at least one silyl ester phosphonate containing the structure of formula (I), based on the total weight of electrolyte composition, preferably at least 0.02 wt.-%, and more preferred at least 0.1 wt.-%, based on the total weight of electrolyte composition. The maximum value of the total concentration of silyl ester phosphonate containing the structure of formula (I) in the electrolyte composition is usually 10 wt.-%, based on the total weight of electrolyte composition, preferably 5 wt.-%, more preferred the upper limit of the total concentration of silyl ester phosphonates containing the structure of formula (I) is 3 wt.-%, based on the total weight of electrolyte composition. Usually the electrolyte composition contains in total 0.01 to 10 wt.-%, of the at least one silyl ester phosphonate containing the structure of formula (I), based on the total weight of electrolyte composition, preferably 0.02 to 10 wt.-%, more preferably 0.1 to 5 wt.-% and most preferred 0.1 to 3 wt.-%.

Furthermore, the electrolyte composition may contain at least one further additive different from the silyl ester phosphonates containing the structure of formula (I). The at least one further additive different from the silyl ester phosphonates containing the structure of formula (I) may be selected from polymers, film forming additives, flame retardants, overcharging additives, wetting agents, HF and/or $H_2O$ scavenger, stabilizer for $LiPF_6$ salt, ionic solvation enhancer, corrosion inhibitors, and gelling agents.

The minimum concentration of the at least one further additive is usually 0.005 wt.-%, preferably the minimum concentration is 0.01 wt.-% and more preferred the minimum concentration is 0.1 wt.-%, based on the total weight of electrolyte composition. The maximum concentration of the at least further additive is usually 25 wt.-%.

One class of further additives are polymers. Polymers may be selected from polyvinylidene fluoride, polyvinylidene-hexafluoropropylene copolymers, polyvinylidene-hexafluoropropylene-chlorotrifluoroethylene copolymers, Nafion, polyethylene oxide, polymethyl methacrylate, polyacrylonitrile, polypropylene, polystyrene, polybutadiene, polyethylene glycol, polyvinylpyrrolidone, polyaniline, polypyrrole and/or polythiophene. Polymers may be added to a formulation according to the present invention in order to convert liquid formulations into quasi-solid or solid electrolytes and thus to improve solvent retention, especially during ageing. In this case they function as gelling agents.

Examples of flame retardants are organic phosphorous compounds like cyclophosphazenes, phosphoramides, alkyl and/or aryl tri-substituted phosphates, alkyl and/or aryl di- or tri-substituted phosphites, alkyl and/or aryl di-substituted phosphonates, alkyl and/or aryl tri-substituted phosphines, and fluorinated derivatives thereof.

Examples of HF and/or $H_2O$ scavenger are optionally halogenated cyclic and acyclic silylamines.

Examples of overcharge protection additives are cyclohexylbenzene, o-terphenyl, p-terphenyl, and biphenyl and the like, preferred are cyclohexylbenzene and biphenyl.

Another class of additives are film forming additives, also called SEI-forming additives. An SEI forming additive according to the present invention is a compound which decomposes on an electrode to form a passivation layer on the electrode which prevents degradation of the electrolyte and/or the electrode. In this way, the lifetime of a battery is significantly extended.

Preferably the SEI forming additive forms a passivation layer on the anode. An anode in the context of the present invention is understood as the negative electrode of a battery. Preferably, the anode has a reduction potential of 1 Volt or less against lithium such as a lithium intercalating graphite anode. In order to determine if a compound qualifies as anode film forming additive, an electrochemical cell can be prepared comprising a graphite electrode and a metal counter electrode, and an electrolyte containing a small amount of said compound, typically from 0.1 to 10 wt.-% of the electrolyte composition, preferably from 0.2 to 5 wt.-% of the electrolyte composition. Upon application of a voltage between anode and lithium metal, the differential capacity of the electrochemical cell is recorded between 0.5 V and 2 V. If a significant differential capacity is observed during the first cycle, for example −150 mAh/V at 1 V, but not or essentially not during any of the following cycles in said voltage range, the compound can be regarded as SEI forming additive.

According to the present invention the electrolyte composition preferably contains at least one SEI forming additive. SEI forming additives are known to the person skilled in the art. More preferred the electrolyte composition contains at least one SEI forming selected from vinylene carbonate and its derivatives such as vinylene carbonate and methylvinylene carbonate; fluorinated ethylene carbonate and its derivatives such as monofluoroethylene carbonate, cis- and trans-difluorocarbonate; organic sultones such as propylene sultone, propane sultone and their derivatives; ethylene sulfite and its derivatives; oxalate comprising compounds such as lithium oxalate, oxalato borates including dimethyl oxalate, lithium bis(oxalate) borate, lithium difluoro (oxalato) borate, and ammonium bis(oxalato) borate, and oxalato phosphates including lithium tetrafluoro (oxalato) phosphate; and sulfur containing additives as described in detail in WO 2013/026854 A1, in particular the sulfur containing additives shown on page 12 line 22 to page 15, line 10.

A compound added may have more than one effect in the electrolyte composition and the electrochemical cell comprising the electrolyte composition. E.g. lithium oxalato borate may be added as additive enhancing the SEI formation but can also function as conducting salt.

In one embodiment of the present invention, the water content of the electrolyte composition is preferably below 100 ppm, based on the weight of the respective inventive formulation, more preferred below 50 ppm, most preferred below 30 ppm. The water content may be determined by titration according to Karl Fischer, e.g. described in detail in DIN 51777 or ISO760: 1978. The minimum water content of electrolyte compositions may be selected from 3 ppm, preferably 5 ppm.

In one embodiment of the present invention, the HF-content of the electrolyte composition is preferably below 100 ppm, based on the weight of the respective inventive formulation, more preferred below 50 ppm, most preferred below 30 ppm. The HF content may be determined by titration.

The electrolyte composition is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C. Such liquid electrolyte compositions are particularly suitable for outdoor applications, for example for use in automotive batteries.

The electrolyte composition (A) may be prepared by methods which are known to the person skilled in the field of the production of electrolytes, generally by dissolving the lithium conductive salt(s) (i) in the corresponding solvent or solvent mixture (ii) and adding the at least one silyl ester phosphonate containing the structure of formula (I) and optionally further additive(s) (iv), as described above.

The electrochemical cell comprising the electrolyte composition (A) may be a lithium battery, a double layer capacitor, or a lithium ion capacitor. The general construction of such electrochemical devices is known and is familiar to the person skilled in this art for batteries.

Preferably the inventive electrochemical cell is a lithium battery. The term "lithium battery" as used herein means an electrochemical cell, wherein the anode comprises lithium metal or lithium ions sometime during the charge/discharge of the cell. The anode may comprise lithium metal or a lithium metal alloy, a material occluding and releasing lithium ions, or other lithium containing compounds. The lithium battery is preferably a secondary lithium battery, i.e. a rechargeable lithium battery.

In particular preferred embodiments the electrochemical cell is a lithium ion battery, i.e. a secondary lithium ion electrochemical cell comprising a cathode (A) comprising a cathode active material that can reversibly occlude and release lithium ions and an anode (B) comprising an anode active material that can reversibly occlude and release lithium ions.

Anode (A) comprises an anode active material that can reversibly occlude and release lithium ions or is capable to form an alloy with lithium. In particular carbonaceous material that can reversibly occlude and release lithium ions can be used as anode active material.

Carbonaceous materials suited are crystalline carbon such as a graphite materials, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon; and carbonic anode active material (thermally decomposed carbon, coke, graphite) such as a carbon composite, combusted organic polymer, and carbon fiber. A preferred carbonaceous material is graphite.

Further examples of anode active materials are lithium metal and lithium metal alloys, i.e. materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Further possible anode active materials are silicon containing materials. Silicon containing materials include silicon itself, e.g. amorphous and crystalline silicon, silicon containing compounds, e.g. $SiO_x$ with $0<x<1.5$ and Si alloys, and compositions containing silicon and/or silicon containing compounds, e.g. silicon/graphite composites and carbon coated silicon containing materials. Silicon itself may be used in different forms, e.g. in the form of nanowires, nanotubes, nanoparticles, films, nanoporous silicon or silicon nanotubes. The silicon may be deposited on a current collector. Current collector may be selected from coated metal wires, a coated metal grid, a coated metal web, a coated metal sheet, a coated metal foil or a coated metal plate. Preferably, current collector is a coated metal foil, e.g. a coated copper foil. Thin films of silicon may be deposited on metal foils by any technique known to the person skilled in the art, e.g. by sputtering techniques. One method of preparing thin silicon film electrodes are described in R. Elazari et al.; Electrochem. Comm. 2012, 14, 21-24.

Other possible anode active materials are lithium ion intercalating oxides of Ti.

Preferably the anode active material comprises carbonaceous material that can reversibly occlude and release lithium ions, particularly preferred the carbonaceous material that can reversibly occlude and release lithium ions is selected from crystalline carbon, hard carbon and amorphous carbon, and particularly preferred is graphite. It is also preferred that the anode active material comprises silicon containing materials. It is further preferred that the anode active material comprises lithium ion intercalating oxides of Ti.

The inventive electrochemical cell comprises a cathode (B) comprising at least one cathode active material. The at least one cathode active material comprises a material capable of occluding and releasing lithium ions and is selected from mixed lithium transition metal oxides containing Mn and at least one second transition metal; lithium intercalating mixed oxides containing Ni, Al and at least one second transition metal; $LiNiPO_4$; $LiNiPO_4$; and $LiCoPO_4$.

Examples of mixed lithium transition metal oxides containing Mn and at least one second transition metal are lithium transition metal oxides with layered structure of formula (II)

$$Li_{1+e}(Ni_aCo_bMn_cM_d)_{1-e}O_2 \qquad (II)$$

wherein
a is in the range of from 0.05 to 0.9, preferred in the range of 0.1 to 0.8,
b is in the range of from zero to 0.35,
c is in the range of from 0.1 to 0.9, preferred in the range of 0.2 to 0.8,
d is in the range of from zero to 0.2,
e is in the range of from zero to 0.3, preferred in the range of >zero to 0.3, more preferred in the range of 0.05 to 0.3,
with a+b+c+d=1, and
M being one or more metals selected from Na, K, Al, Mg, Ca, Cr, V, Mo, Ti, Fe, W, Nb, Zr, and Zn.

Cobalt containing compounds of formula (II) are also named NCM.

Lithium transition metal oxides with layered structure of formula (II) wherein e is larger than zero are also called overlithiated.

Preferred lithium transition metal oxides with layered structure of formula (II) are compounds forming a solid solution wherein a LiM'O$_2$ phase in which M' is Ni, and optionally one or more transition metals selected from Co and Mn and a Li$_2$MnO$_3$ phase are mixed and wherein one or more metal M as defined above may be present. The one or more metals M are also called "dopants" or "doping metal" since they are usually present at minor amounts, e.g. at maximum 10 mol-% M or at maximum 5 mol-% M or at maximum 1 mol.-% based on the total amount of metal except lithium present in the transition metal oxide. In case one or more metals M are present, they are usually present in an amount of at least 0.01 mol-% or at least 0.1 mol-% based on the total amount of metal except lithium present in the transition metal oxide. These compounds are also expressed by formula (IIa)

$$z\, LiM'O_2 \cdot (1-z)Li_2MnO_3 \quad \text{(IIa)}$$

wherein M' is Ni and at least one metal selected from Mn and Co;

z is 0.1 to 0.8, and wherein one or more metals selected from Na, K, Al, Mg, Ca, Cr, V, Mo, Ti, Fe, W, Nb, Zr, and Zn may be present.

Electrochemically, the Ni and if present Co atoms in the LiM'O$_2$ phase participate in reversible oxidation and reduction reactions leading to Li-ions deintercalation and intercalation, respectively, at voltages below 4.5 V vs. Li$^+$/Li, while the Li$_2$MnO$_3$ phase participates only in oxidation and reduction reactions at voltages equal or above 4.5 V vs. Li$^+$/Li given that Mn in the Li$_2$MnO$_3$ phase is in its +4 oxidation state. Therefore, electrons are not removed from the Mn atoms in this phase but from the 2p orbitals of oxygen ions, leading to the removal of oxygen for the lattice in the form of O$_2$ gas at least in the first charging cycling.

These compounds are also called HE-NCM due to their higher energy densities in comparison to usual NCMs. Both HE-NCM and NCM have operating voltages of about 3.0 to 3.8 V against Li/Li$^+$, but high cut off voltages have to be used both for activating and cycling of HE-NCMs to actually accomplish full charging and to benefit from their higher energy densities. Usually the upper cut-off voltage for the cathode during charging against Li/Li$^+$ is of at least 4.5 V for activating the HE-NCM, preferably of at least 4.6 V, more preferred of at least 4.7 V and even more preferred of at least 4.8 V. The term "upper cut-off voltage against Li/Li$^+$ during charging" of the electrochemical cell means the voltage of the cathode of the electrochemical cell against a Li/Li$^+$ reference anode which constitute the upper limit of the voltage at which the electrochemical cell is charged. Examples of HE-NCMs are 0.33Li$_2$MnO$_3$·0.67Li(Ni$_{0.4}$Co$_{0.2}$Mn$_{0.4}$)O$_2$, 0.42Li$_2$MnO$_3$·0.58Li(Ni$_{0.4}$Co$_{0.2}$Mn$_{0.4}$)O$_2$, 0.50Li$_2$MnO$_3$·0.50Li(Ni$_{0.4}$Co$_{0.2}$Mn$_{0.4}$)O$_2$, 0.40Li$_2$MnO$_3$·0.60Li(Ni$_{0.8}$Co$_{0.1}$Mn$_{0.1}$)O$_2$, and 0.42Li$_2$MnO$_3$·0.58Li(Ni$_{0.6}$Mn$_{0.4}$)O$_2$.

Examples of manganese-containing transition metal oxides with layer structure of formula (II) wherein d is zero are LiNi$_{0.33}$Mn$_{0.67}$O$_2$, LiNi$_{0.25}$Mn$_{0.75}$O$_2$, LiNi$_{0.35}$Co$_{0.15}$Mn$_{0.5}$O$_2$, LiNi$_{0.21}$Co$_{0.08}$Mn$_{0.71}$O$_2$, LiNi$_{0.22}$Co$_{0.12}$Mn$_{0.66}$O$_2$, LiNi$_{0.8}$Co$_{0.1}$Mn$_{0.1}$O$_2$, LiNi$_{0.6}$Co$_{0.2}$Mn$_{0.2}$O$_2$, and LiNi$_{0.5}$Co$_{0.2}$Mn$_{0.3}$O$_2$. It is preferred that the transition metal oxides of general formula (II) wherein d is zero do not contain further cations or anions in significant amounts.

Examples of manganese-containing transition metal oxides with layer structure of formula (II) wherein d is larger than zero are 0.33Li$_2$MnO$_3$·0.67Li(Ni$_{0.4}$Co$_{0.2}$Mn$_{0.4}$)O$_2$, 0.42Li$_2$MnO$_3$·0.58Li(Ni$_{0.4}$Co$_{0.2}$Mn$_{0.4}$)O$_2$, 0.50Li$_2$MnO$_3$·0.50Li(Ni$_{0.4}$Co$_{0.2}$Mn$_{0.4}$)O$_2$, 0.40Li$_2$MnO$_3$·0.60Li(Ni$_{0.8}$Co$_{0.1}$Mn$_{0.1}$)O$_2$, and 0.42Li$_2$MnO$_3$·0.58Li(Ni$_{0.6}$Mn$_{0.4}$)O$_2$ wherein one or more metal M selected from Na, K, Al, Mg, Ca, Cr, V, Mo, Ti, Fe, W, Nb, Zr, and Zn may be present. The one or more doping metal is preferably present up to 1 mol-%, based on the total amount of metal except lithium present in the transition metal oxide.

Other preferred compounds of formula (II) are Ni-rich compounds, wherein the content of Ni is at least 50 mol. % based on the total amount of transition metal present. This includes compounds of formula (IIb)

$$Li_{1+e}(Ni_aCo_bMn_cM_d)_{1-e}O_2 \quad \text{(IIb)}$$

wherein a is in the range of from 0.5 to 0.9, preferred in the range of 0.5 to 0.8, b is in the range of from zero to 0.35, c is in the range of from 0.1 to 0.5, preferred in the range of 0.2 to 0.5, d is in the range of from zero to 0.2, e is in the range of from zero to 0.3, with a+b+c+d=1, and M being one or more metals selected from Na, K, Al, Mg, Ca, Cr, V, Mo, Ti, Fe, W, Nb, Zr, and Zn.

Examples of Ni-rich compounds of formula (I) are Li[Ni$_{0.8}$Co$_{0.1}$Mn$_{0.1}$]O$_2$ (NCM 811), Li[Ni$_{0.6}$Co$_{0.2}$Mn$_{0.2}$]O$_2$ (NCM 622), and Li[Ni$_{0.5}$Co$_{0.2}$Mn$_{0.3}$]O$_2$ (NCM 523).

Further examples of mixed lithium transition metal oxides containing Mn and at least one second transition metal are manganese-containing spinels of formula (III)

$$Li_{1+t}M_{2-t}O_{4-s}s \quad \text{(III)}$$

wherein s is 0 to 0.4, t is 0 to 0.4, and

M is Mn and at least one further metal selected from Co and Ni, preferably M is Mn and Ni and optionally Co, i.e. a part of M is Mn and another part of Ni, and optionally a further part of M is selected from Co.

The cathode active material may also be selected from lithium intercalating mixed oxides containing Ni, Al and at least one second transition metal, e.g. from lithium intercalating mixed oxides of Ni, Co and Al. Examples of mixed oxides of Ni, Co and Al are compounds of formula (IV)

$$Li[Ni_hCo_iAl_j]O_2 \quad \text{(IV)}$$

wherein h is 0.7 to 0.9, preferred 0.8 to 0.87, and more preferred 0.8 to 0.85;

i is 0.15 to 0.20; and j is 0.02 to 10, preferred 0.02 to 1, more preferred 0.02 to 0.1, and most preferred 0.02 to 0.03.

The cathode active material may also be selected from LiMnPO$_4$, LiNiPO$_4$ and LiCoPO$_4$. These phosphates show usually olivine structure and usually upper cut-off voltages of at least 4.5 V have to be used for charging.

Cathode (B) may contain further components like binders and electrically conductive materials such as electrically conductive carbon. For example, cathode (B) may comprise carbon in a conductive polymorph, for example selected from graphite, carbon black, carbon nanotubes, graphene or mixtures of at least two of the aforementioned substances. Examples of binders used in cathode (B) are organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinylidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Anode (A) and cathode (B) may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive electrochemical cells may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin or Nafion separators.

Several inventive electrochemical cells may be combined with one another, for example in series connection or in parallel connection. Series connection is preferred. The present invention further provides for the use of inventive electrochemical cells as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive electrochemical cells can also be used for stationary energy stores.

The present invention is further illustrated by the following examples that do not, however, restrict the invention.

Experimental Section:
I. Additives:
I.1 Overview of Electrolyte Additives Employed:

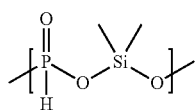

R1

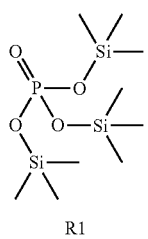

R2

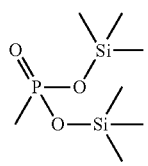

A1

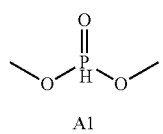

A2

Oligomer of A2 with repeating unit

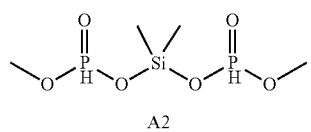

A3

Branched oligomer of A2 with repeating units

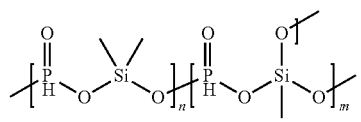

A4

Branched oligomer of A2 with repeating units

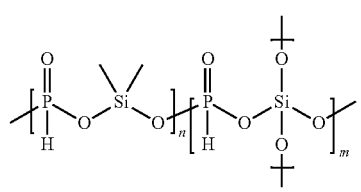

A5

Oligomer of A2 with trimethylsilyl termination and repeating units

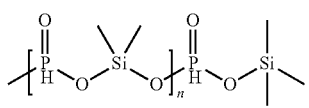

A6

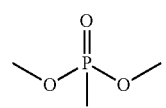

A7

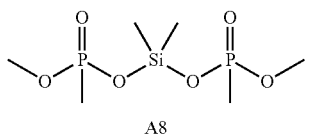

A8

Oligomer of A8 with repeating unit

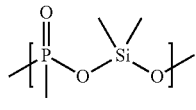

A9

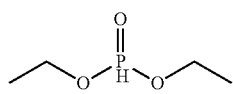

A10

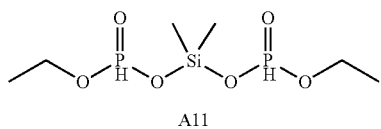

A11

Oligomer of A11 with repeating unit

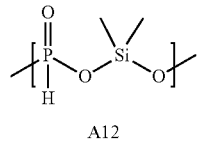

A12

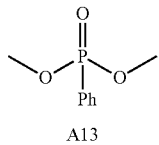

A13

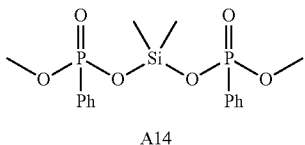

A14

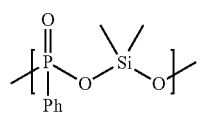

A15

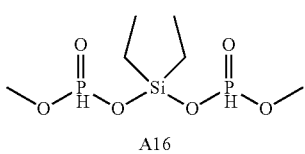

A16

Oligomer of A16 with repeating unit

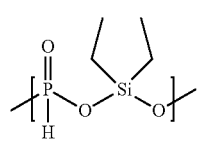

A17

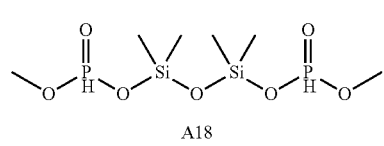

A18

Oligomer of A18 with repeating unit

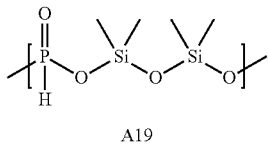

A19

Ph: phenyl

Units in square brackets denote repeating monomeric units. The oligomers are usually terminated by —OP(O)H—OCH$_3$ or —OP(O)H—OCH$_2$CH$_3$ except for such oligomers containing a Si(CH$_3$)$_3$ end group.

I.2 Preparation of the Additives

The comparative additive R1 was commercially available. Comparative additive R2 was prepared according to R. Rabinowitz, J. Org. Chem., Vol. 28 (1963), pages 2975 to 2978. The additive mixtures M1 to M12 containing molecular entities A1 to A19 were synthesized according to K. Kellner, L. Rodewald, Monatshefte für Chemie, Vol. 121 (1990), pages 1031 to 1038.

All compounds were analyzed using $^1$H NMR spectroscopy and $^{31}$P NMR spectroscopy directly after preparation. Samples were prepared and measured under inert atmosphere using CDCl$_3$ (7.26 ppm) as a reference; when electrolytes were analyzed screw-cap NMR tubes were used equipped with an inner tube filled with C$_6$D$_6$ as reference (7.16 ppm). The spectra were recorded on a BrukerAvance III equipped with a CryoProbe Prodigy probe head or on a Varian NMR system 400 operating at a frequency of $^1$H: 500.36 MHz, $^{31}$P: 202.56 MHz. $^{31}$P NMR data were collected for the sake of clarity decoupled from proton: {1 H}. The relaxation time D1 for $^{31}$P NMR measurements was increased to 60 sec to determine the quantities of each P-species accordingly. MNova software was used to analyze the spectra.

For viscosity measurements an Anton Paar Physica MCR 51 was used. Measurements were conducted at 20° C. with shear stress profile from 1 to 1000 s$^{-1}$ and averages were calculated to obtain the given values.

A summary of all additive mixtures prepared is shown in Table 1.

Experiment 1-Mixture M1:

Following above described method, Me$_2$SiCl$_2$ (1.0 eq, 800 mmol, 104.8 g) was added at room temperature (RT) to dimethylphosphite (1.0 eq, 800 mmol, 88.0 g) and stirred at 90° C. for 1 h until the formation of volatile methylchloride has ceased. The flask with formed colorless residue was equipped with a distillation bridge and heated (1 h, 100° C., 0.2 mbar) to yield silyl-H-phosphonates M1 as a colorless oil (105 g, 95% yield; chloride content 55 ppm).

M1 was obtained as a mixture of A1, dimer A2 and oligomers A3 with the repeating unit of [PHO(OSiMe$_2$O)] and CH$_3$OP(O)H-termination. The ratio of A1:A2:A3 was evaluated by integration of all signals in the range from −14−−17.5 ppm (for A3), at −2.5 ppm (for A2) and at 10.4 ppm (for A1) in the $^{31}$P NMR spectrum. For above described conditions a ratio A1:A2:A3 of 1:27:72 was found.

Viscosity: 170 mPas

Mn (M1)=957 g/mol was determined by $^{31}$P NMR in the following way: The oligomer A3 may be divided theoretically into different units: two P-containing termination groups [2×CH$_3$OP(O)H—, together 158.03 g/mol], n Si- and P-containing repeating units [n×(CH$_3$)$_2$SiO$_2$P(O)H-unit, 138.14 g/mol per unit] and one additional (CH$_3$)$_2$SiO$_2$-unit (90.15 g/mol) according to the structure

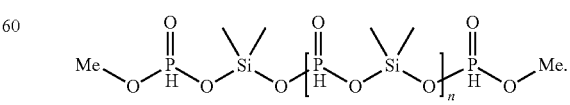

For calculating the number average molecular weight the signal of the termination groups in the $^{31}$P-NMR spectrum (quantitatively measured with a relaxation time D1=60 s)

was set to 2. In consequence the signals of the repeating units yield the number n of the repeating units. The number average molecular weight is calculated by adding the molecular weight of the termination groups, n×the molecular weight of the repeating unit and the molecular weight of the additional $CH)_2SiO_2$-unit.

Reaction yields were calculated based on the difference of the amount of starting materials, the released amount of alkyl chloride and the weight of obtained oligomer mixture.

Experiment 2-Mixture M2:

Following the conditions described in experiment 1, $Me_2SiCl_2$ (0.9 eq, 765 mmol, 98.7 g), $MeSiCl_3$ (0.1 eq, 85 mmol, 12.7 g) and dimethylphosphite (1.0 eq, 850 mmol, 93.5 g) were converted to yield M2 (95.0 g, 87% yield). The ratio of A1:A2:A4 was evaluated by integration of all signals in the range from −14−−17.5 ppm (for A4), at −2.5 ppm (for A2) and at 10.4 ppm (for A1) in the $^{31}P$ NMR spectrum. For above described conditions a ratio A1:A2:A4 of 2:35:63 was found.

Viscosity: 180 mPas

Experiment 3-Mixture M3:

Following the conditions described in experiment 1, $Me_2SiCl_2$ (0.9 eq, 72 mmol, 9.47 g), $SiCl_4$ (0.1 eq, 8 mmol, 1.4 g) and dimethylphosphite (1.0 eq, 80 mmol, 8.8 g) were converted to yield M3. The ratio of A1:A2:A5 was evaluated by integration of all signals in the range from −14−−17.5 ppm (for A5), at −2.5 ppm (for A2) and at 10.4 ppm (for A1) in the $^{31}P$ NMR spectrum. For above described conditions a ratio A1:A2:A5=1:20:79 was found.

Experiment 4-Mixture M4:

Following the conditions described in experiment 1, $Me_2SiCl_2$ (0.9 eq, 99 mmol, 12.9 g), $Me_3SiCl$ (0.1 eq, 11 mmol, 1.21 g) and dimethylphosphite (0.73 eq, 80 mmol, 8.80 g) were converted to yield M4 (8.80 g, 80% yield). The ratio of A1:A2:A6 was evaluated by integration of all signals in the range from −14−−17.5 ppm (for A6), at −2.5 ppm (for A2) and at 10.4 ppm (for A1) in the $^{31}P$ NMR spectrum. For above described conditions a ratio A1:A2:A6 of 1:34:65 was found.

Experiment 5-Mixture M5:

Following the conditions described in experiment 1, $Me_2SiCl_2$ (1.0 eq, 850 mmol, 109.7 g) and dimethylphosphite (1.0 eq, 850 mmol, 93.5 g) were reacted for prolonged time (4 h) using avertical-intense condenser with a cooling medium at −10° C. to yield M5 after distillation of all volatiles (116.0 g, 98% yield). The ratio of A1:A2:A3 was evaluated by integration of all signals in the range from −14−−17.5 ppm (for A3), at −2.5 ppm (for A2) and at 10.4 ppm (for A1) in the $^{31}P$ NMR spectrum. For above described conditions a ratio A1:A2:A3 of 1:11:88 was found. Mn=2021 g/mol was determined by $^{31}P$ NMR as discussed for experiment 1.

Viscosity: 750 mPas

Experiment 6-Mixture M6:

Following the conditions described in experiment 5, $Me_2SiCl_2$ (1.0 eq, 83 mmol, 107.5 g) and dimethylphosphite (0.90 eq, 75 mmol, 82.5 g) were converted to yield M6 (103.0 g, 99% yield). The ratio of A1:A2:A3 was evaluated by integration of all signals in the range from −14−−17.5 ppm (for A3), at −2.5 ppm (for A2) and at 10.4 ppm (for A1) in the $^{31}P$ NMR spectrum. For above described conditions a ratio A1:A2:A3 of 0:3:97 was found.

Experiment 7-Mixture M7:

Following the conditions described in experiment 1, $Me_2SiCl_2$ (1.0 eq, 70 mmol, 9.12 g) and di-methylmethylphosphonate (1.0 eq, 70 mmol, 8.95 g) were converted to yield M7 (9.80 g, 92% yield). The ratio of A7:A8:A9 was evaluated by integration of all signals in the range from 8-12 ppm (for A9), at 21-23 ppm (for A8) and at 33 ppm (for A7) in the $^{31}P$ NMR spectrum. For above described conditions a ratio A7:A8:A9=1:30:69 was found.

Experiment 8-Mixture M8:

Following the conditions described in experiment 1, $Me_2SiCl_2$ (1.0 eq, 50 mmol, 6.45 g) and di-ethylphosphite (1.0 eq, 50 mmol, 7.12 g) were converted to yield M8 (3.80 g, 53% yield). The ratio of A10:A11:A12 was evaluated by integration of all signals in the range from −14−−17.5 ppm (for A12), at −4.2 ppm (for A11) and at 7.2 ppm (for A10) in the $^{31}P$ NMR spectrum. For above described conditions a ratio A10:A11:A12=1:81:18 was found.

Experiment 10-Mixture M10:

Following the conditions described in experiment 1, $Me_2SiCl_2$ (1.0 eq, 70 mmol, 9,17 g) and dimethyl phenylphosphonate (1.0 eq, 70 mmol, 13,30 g) were converted to yield M10 neu (13,6 g, 88% yield). The ratio of A13 neu:A14 neu:A15 neu was evaluated by integration of all signals in the range from −0.2−−2.5 ppm (for A15 new), at 10.4 ppm (for A14 new) and at 21.5 ppm (for A13 new) in the $^{31}P$ NMR spectrum. For above described conditions a ratio A13 neu:A14 neu:A15 neu=1:55:44 was found.

Viscosity: 1519 mPas

Mn=753 g/mol was determined by $^{31}P$ NMR as discussed for experiment 1; except that the termination groups [2×$CH_3OP(O)H$—, together 310.24 g/mol], n Si- and P-containing repeating units [n×$(CH_3)_2SiO_2P(O)H$-unit, 214.25 g/mol per unit] and one additional $(CH_3)_2SiO_2$-unit (90.15 g/mol) according to the structure, were calculated.

Experiment 11-Mixture M11:

Following the conditions described in experiment 1, $Et_2SiCl_2$ (1.0 eq, 70 mmol, 7,86 g) and dimethylphosphite (1.0 eq, 70 mmol, 11,34 g) were converted to yield M11 (15,3 g, 98% yield). The ratio of A17:A16:A12 was evaluated by integration of all signals in the range from −14−−17.5 ppm (for A17), at −4.2 ppm (for A16) and at 10.4 ppm (for A1) in the $^{31}P$ NMR spectrum. For above described conditions a ratio A1:A16:A17=2:90:8 was found.

Experiment 12-Mixture M12:

Following the conditions described in experiment 1, $ClMe_2SiOSiMe_2Cl$ (1.0 eq, 80 mmol, 6.45 g) and dimethylphosphite (1.0 eq, 80 mmol, 9.00 g) were converted to yield M12 (15.40 g, 87% yield). The ratio of A1:A18:A19 was evaluated by integration of all signals in the range from −15−−17.5 ppm (for A12), at −2.7 ppm (for A11) and at 10.4 ppm (for A1) in the $^{31}P$ NMR spectrum. For above described conditions a ratio A1:A18:A19=1:9:80 was found.

Experiments 9 to 12-Mixtures M9 to M12:

Mixtures M9 to M12 were prepared and evaluated as described in experiment 1 with the educts, ratios of educts and reaction conditions listed in Table 1. The composition of the mixtures obtained is also displayed in Table 1.

TABLE 1

Silyl ester phosphonate mixtures prepared

| Exp. | Ratio of starting materials | additional component [eq.] | Conditions | Compounds |
|---|---|---|---|---|
| 1 | 1:1 $HPO(OMe)_2$: $Me_2SiCl_2$ | — | 90° C., 60 min | M1:A1:A2:A3 = 1:27:72 |
| 2 | 1:0.9 (" ) | 0.1 ($MeSiCl_3$) | 90° C., 60 min | M2:A1:A2:A4 = 2:35:63 |
| 3 | 1:0.9 (" ) | 0.1 ($SiCl_4$) | 90° C., 60 min | M3:A1:A2:A5 = 1:20:79 |

TABLE 1-continued

Silyl ester phosphonate mixtures prepared

| Exp. | Ratio of starting materials | additional component [eq.] | Conditions | Compounds |
|---|---|---|---|---|
| 4 | 0.73:0.9 ( " ) | 0.1 (Me$_3$SiCl) | 90° C., 60 min | M4:A1:A2:A6 = 1:34:65 |
| 5 | 1:1 ( " ) | — | 240 min, condenser at −10° C. | M5:A1:A2:A3 = 1:11:88 |
| 6 | 0.9:1 ( " ) | — | 240 min, condenser at −10° C. | M6:A1:A2:A3 = 0:3:97 |
| 7 | 1:1 MePO(OMe)$_2$: Me$_2$SiCl$_2$ | — | 90° C., 60 min | M7:A7:A8:A9 = 1:30:69 |
| 8 | 1:1 HPO(OEt)$_2$: Me$_2$SiCl$_2$ | — | 90° C., 60 min | M8:A10:A11: A12 = 1:81:18 |
| 10 | 1:1 PhPO(OMe)$_2$: Me$_2$SiCl$_2$ | — | 90° C., 60 min | M10:A13:A14: A15 = 1:55:44 |
| 11 | 1:1 HPO(OMe)$_2$: Et$_2$SiCl$_2$ | — | 90° C., 60 min | M11:A1:A16: A17 = 2:90:8 |
| 12 | 1:1 HPO(OMe)$_2$: ClSiMe$_2$OSiMe$_2$Cl | — | 90° C., 60 min | M12:A1:A18: A19 =1:19:80 |

Me: CH$_3$
Et: CH$_2$CH$_3$

II. Electrolyte Compositions

The electrolyte compositions were prepared by dissolving 1.0 M LiPF$_6$ in different mixtures of ethyl carbonate (EC, BASF), diethyl carbonate (DEC, BASF), monofluoroethylene carbonate (FEC, BASF), 1 H,1 H,5H-perfluoropentyl-1,1,2,2-tetrafluoroethylether (CF$_2$H(CF$_2$)$_3$CH$_2$OCF$_2$CF$_2$H, FPEE, Foosung co., Ltd). The comparative additives R1 and R2 and inventive additive mixtures M1, M2 and M7 were added to these compositions as indicated in Table 2. R2, M1, M2 and M7 were used without further purification. "vol. %" refers to the volume of the solvents in the electrolyte composition, "wt. %" refer to the total weight of the electrolyte composition. All solvents were dry (water content <3 ppm). All electrolyte compositions were prepared and stored in an Ar-filled glovebox having oxygen and water levels below 1.0 ppm. The electrolyte compositions used are summarized in Table 2.

TABLE 2

Electrolyte compositions

| Electrolyte composition | Solvents [vol. %] | | | | Additives [wt. %] | | | | | | |
|---|---|---|---|---|---|---|---|---|---|---|---|
| | EC | FEC | DEC | FPEE | FEC | VC | R1 | R2 | M1 | M2 | M7 |
| EL 1 (comparative) | — | 12 | 64 | 24 | — | — | — | — | — | — | — |
| EL 2 (comparative) | — | 12 | 64 | 24 | — | — | 2 | — | — | — | — |
| EL 3 (comparative) | — | 12 | 64 | 24 | — | — | — | 2 | — | — | — |
| EL 4 (inventive) | — | 12 | 64 | 24 | — | — | — | — | — | 2 | — |
| EL 5 (inventive) | — | 12 | 64 | 24 | — | — | — | — | 2 | — | — |
| EL 6 (comparative) | 30 | — | 70 | — | 1.5 | 1 | — | — | — | — | — |
| EL 7 (comparative) | 30 | — | 70 | — | 1.5 | 1 | 2 | — | — | — | — |
| EL 8 (comparative) | 30 | — | 70 | — | 1.5 | 1 | — | 2 | — | — | — |
| EL 9 (inventive) | 30 | — | 70 | — | 1.5 | 1 | — | — | 2 | — | — |
| EL 10 (comparative) | 30 | — | 70 | — | 1.5 | 1 | — | — | — | — | 2 |

III. Electrochemical Cells

III.1) HE-NCM/Graphite 2032 Full Coin Cells

The positive electrodes for the electrochemical cycling experiments were prepared by coating a slurry containing 92.5 wt. % of cathode active material, 2 wt. % Graphite, 2 wt. % Super C65 carbon black and 3.5 wt. % polyvinylidenefluoride (PVDF) binder suspended in N-ethyl-2-pyrrolidinone (NEP) on aluminum foil. The cathode active material was the HE-NCM 0.42Li$_2$MnO$_3$ •0.56Li(Ni$_{0.4}$Mn$_{0.4}$Co$_{0.2}$)O$_2$, HE-NCM, BASF). Commercial graphite-coated tapes from Elexcel Corporation Ltd. were used as negative electrodes. The positive, negative composite electrodes, a polypropylene separator (Celgard) and the respective electrolyte were used to manufacture 2032 coin cells. All cells were assembled in an argon-filled glove box having oxygen and water levels below 1.0 ppm and their electrochemical testing carried out in a Maccor 4000 Battery-Test System.

III.2) NCM622/Graphite and NCM811/Graphite Pouch Cells

The positive electrodes for the electrochemical cycling experiments in pouch cells were prepared by coating on aluminum foil (thickness=17 μm) using a roll coater a slurry containing cathode active material, carbon black and polyvinylidene fluoride (PVdF) binders suspended in N-methyl-2-pyrrolidinone (NMP). The electrode tapes were dried in a hot air chamber and dried further under vacuum at 130° C. for 8 h and the electrodes were pressed using a roll pressor. The cathode active materials employed were either Li(Ni$_{0.8}$Co$_{0.1}$Mn$_{0.1}$)O$_2$ (NCM811) or Li(Ni$_{0.6}$Co$_{0.2}$Mn$_{0.2}$)O$_2$ (NCM622). For the negative electrodes, an aqueous slurry aqueous was prepared by mixing graphite and carbon black with CMC (carboxymethyl cellulose) and SBR (styrene butadiene rubber). The obtained slurry was coated onto copper foil (thickness=9 μm) by using a roll coater and dried under hot air chamber (80° C. to 120° C.). The loading of the resulted electrode was found to be 10 mg/cm$^2$. The electrodes were pressed by roll pressor to an approximate thickness of 72 μm. Pouch cells (250 mAh) were assembled in Ar-filled glove box, comprising NCM positive electrodes and graphite negative electrodes with a separator superposed between cathode and anode. Thereafter, all cells were filled with electrolyte, as described in Table 2, in an argon-filled glove box having oxygen and water levels below 1.0 ppm and their electrochemical testing carried out in a Maccor 4000 battery-test system.

IV. Evaluation of the Electrochemical Cells

IV.1) Evaluation of Cycling and Cell Resistance in HE-NCM/Graphite 2032 Coin Full Cells at 25° C.

The cells were charged at a constant current of 0.067 C to a voltage of 4.7 V and discharged with a constant current of 0.067 C to a discharge voltage of 2.0 V (First activation cycle) at 25° C.

Immediately after, the cells are charged at 25° C. at a constant current of 0.1 C to a voltage of 4.6 V. The cells were further charged at 4.6 V until the current reached a value of 0.05 C and then discharged at a constant current of 0.1 C to a discharge voltage of 2.0 V (second cycle). The same procedure as in the second cycle was repeated once (cycle 3). The cells are then charged at a constant current of 0.1 C to a voltage of 4.6 V and then discharged at a constant current of 0.1 C to a discharge voltage of 2.0 V (cycle 4). The charge capacity from this cycle is used as reference value for the subsequent cycle (cycle 5), in which the cells are charged at a constant current of 0.1 C up to 40% of the charge capacity of cycle 5 (40% SOC). Once the cells reached 40% SOC, DC internal resistance (DCIR) measurements were carried out by applying a 0.2 C current interrupt during 10 seconds.

In the cycles 6 to 7, the cells are charged at 25° C. at a constant current of 0.2 C to a voltage of 4.6 V. The cells were further charged at 4.6 V until the current reached a value of 0.05 C and then discharged at a constant current of 0.5 C to a discharge voltage of 2.0 V. Then, the cells are charged at a constant current of 0.7 C to a voltage of 4.6 V, charged at 4.6 V until the current reached a value of 0.05 C and while keeping constant these charging conditions then the cells are discharged to a discharge voltage of 2.0 V at a constant current of 1 C (2 times, cycles 8 to 9), 2 C (2 times, cycles 10 to 11) and 3 C (2 times, cycles 12 to 13). The discharge capacity recorded for cycle 13 is expressed as a percentage of the discharge capacity obtained in cycle 3 (see Discharge capacity ratio 3C/0.1C (%) in Table 3).

Following the variation of discharge rates, prolonged cycling was carried out by charging the cells at a constant current of 0.7 C to a voltage of 4.6 V, charging at 4.6 V until the current reached a value of 0.05 C and discharging to a discharge voltage of 2.0 V at a constant current of 1 C (Cycle 14). The discharge capacity measured for cycle 14 was recorded as the first discharge capacity at 1 C. This charge and discharge procedure was repeated at least 200 times or until the measured charge capacity is lower than 70% of the charge capacity of cycle 14. During the prolonged cycling experiments, DC internal resistance (DCIR) measurements were carried out at 40% SOC every 100 cycles. The latter was accomplished by repeating the cycling sequence described for cycles 2 to 5 every 100 1C-cycles. The results from the various examples are presented in Table 3.

TABLE 3

Results obtained from HE-NCM/Graphite cells cycling experiments at 25° C.

| | Electrolyte | Discharge capacity ratio 3 C/0.1 C (%) | Capacity Retention after 100 cycles at 1 C (%) | Capacity Retention after 200 cycles at 1 C (%) | Cell Resistance after 200 cycles at 1 C (Ohm cm$^2$) |
|---|---|---|---|---|---|
| Comparative Example 1 | EL1 | 53% | 82.2% | 73.3% | 343 |
| Comparative Example 2 | EL2 | 52% | 89.5% | 83.3% | 234 |
| Comparative Example 3 | EL3 | 56% | 92.7% | 89.3% | 222 |
| Inventive Example 1 | EL4 | 57% | 99.4% | 96.3% | 171 |
| Inventive Example 2 | EL5 | 61% | 97.8% | 94.4% | 152 |

The discharge capacities and cell resistances of the cells containing the oligomeric silyl ester phosphonates are comparable or clearly better than the values for the monomeric additives, wherein the oligomeric additives have the advantage of being less volatile. This facilitates constant additive concentrations during the preparation and handling of the electrolyte compositions and filling the electrolyte composition into the cells. Usually vacuum is applied to the cells before filling the cell with a liquid electrolyte to ensure good filling of the cell and good wetting of all parts by the liquid electrolyte composition.

IV.2 Evaluation of Cycling of Pouch Cell Comprising NCM 622 and 811 Cathode and Graphite Anode IV.2.1) Formation Pouch full-cells prepared comprising a NCM 622 or NCM 811 cathode and graphite anode were charged at a constant current of 0.1 C either to a voltage of 3.7 V or during maximum 2 hours. Then, the cells were stored for 17 hours at 45° C. followed by degassing and initial volume measurements carried out via Archimedes measurements in water at ambient temperature.

IV.2.2) High temperature storage of pouch full-cell comprising NCM622//graphite and NCM811//graphite at 60° C.

After completing the formation procedure, the cells were charged up to 4.2 V at ambient temperature and then stored at 60° C. for 14 days. The generated gas amount (mL) during the storage was determined by Archimedes measurements in water at ambient temperature and the results are summarized in Table 6. The final charge (CCCV charge, 0.2 C, 4.2 V, 0.015 C cut-off) and discharge (CC discharge, 0.2 C, 3.0 V cut-off) capacities were measured after storage tests. The capacity retention after cycling is expressed as the ratio between the final and initial discharge capacity. The cell resistance after cycling was determined by charging the cells up to 50% SOC and DC internal resistance (DCIR) measurements by applying a current interrupt. The results from the various examples are presented in Tables 4 and 5. The inventive electrochemical cells show clearly lower gas generation than the comparative cells.

TABLE 4

Results obtained from NCM-622/Graphite cells storage experiments at 60° C.

| | Electrolyte | Cell volume change after 3 days storage at 60° C. [mL] | Cell volume change after 6 days storage at 60° C. [mL] | Cell volume change after 14 days storage at 60° C. [mL] |
|---|---|---|---|---|
| Comparative Example 4 | EL6 | 1.86 | 2.06 | 1.86 |
| Comparative Example 5 | EL7 | 1.46 | 2.06 | 1.29 |
| Comparative Example 6 | EL8 | 0.91 | 1.03 | 0.79 |
| Inventive Example 3 | EL9 | 0.12 | 0.13 | 0.14 |
| Comparative Example 7 | EL 10 | — | 0.24 | 0.15 |

TABLE 5

Results obtained from NCM-811/Graphite cells storage experiments at 60° C.

| | Electrolyte | Cell volume change after 1 day storage at 60° C. [mL] | Cell volume change after 6 days storage at 60° C. [mL] | Cell volume change after 14 days storage at 60° C. [mL] |
|---|---|---|---|---|
| Comparative Example 8 | EL6 | 0.29 | 0.63 | 0.90 |
| Comparative Example 9 | EL7 | 0.38 | 0.52 | 0.65 |
| Comparative Example 10 | EL8 | 0.26 | 0.36 | 0.43 |
| Comparative Example 11 | EL 10 | 0.13 | 0.15 | 0.16 |
| Inventive Example 4 | EL9 | 0.06 | 0.03 | 0.07 |

What is claimed is:

1. An electrolyte composition, comprising:
    at least one aprotic organic solvent;
    at least one conducting salt comprising at least one lithium salt;
    at least one silyl ester phosphonate having the structure of formula (I):

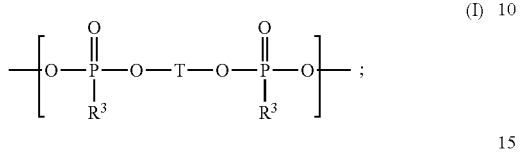
(I)

wherein:
T is selected from the group consisting of

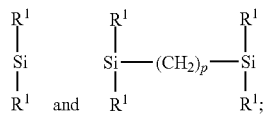

p is an integer from 0 to 6;
one or more $CH_2$ groups of $(CH_2)p$ are optionally replaced by O;
one or more H of $(CH_2)p$ are optionally replaced by $C_1$-$C_4$ alkyl;
each $R^1$ is independently selected from the group consisting of H, F, Cl, $R^4$, $OR^4$, $OSi(R^5)_3$, $OSi(OR^4)_3$, and $OP(O)(OR^4)R^5$;
each $R^4$ is independently selected from the group consisting of $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl;
each $R^4$ is independently and optionally substituted by one or more substituents selected from the group consisting of CN and F;
one or more $CH_2$-groups of alkyl, alkenyl, and alkynyl, if present in $R^4$ and not directly bound to Si or O are optionally replaced by O;
$R^3$ and $R^5$ are each independently selected from the group consisting of H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl;
each optionally substituted by one or more substituents selected from the group consisting of CN and F; and
one or more $CH_2$-groups of alkyl, alkenyl, and alkynyl, if present in $R^3$ and/or $R^5$ and not directly bound to P, are optionally replaced by O,
wherein the electrolyte composition comprises 0.01 to 10 wt.-% of the at least one silyl ester phosphonate based on the total weight of the electrolyte composition.

2. The electrolyte composition of claim 1, wherein each $R^1$ is independently selected from the group consisting of H, F, Cl, $C_1$-$C_{10}$ alkyl, and $OC_1$-$C_{10}$ alkyl, and
wherein the $C_1$-$C_{10}$ alkyl and/or the $OC_1$-$C_{10}$ alkyl is optionally substituted by one or more substituents selected from the group consisting of CN and F, and wherein one or more $CH_2$-groups of the $C_1$-$C_{10}$ alkyl and/or the $OC_1$-$C_{10}$ alkyl which are not directly bound to Si or O are optionally replaced by O.

3. The electrolyte composition of claim 1, wherein each $R^3$ is independently selected from the group consisting of H and $C_1$-$C_{10}$ alkyl,
wherein each $R^3$ is optionally substituted by one or more F and/or CN, and
wherein one or more $CH_2$-groups of the $C_1$-$C_{10}$ alkyl which are not directly bound to P are optionally replaced by O.

4. The electrolyte composition of claim 1, wherein the structure of formula (I) is selected from the group consisting of

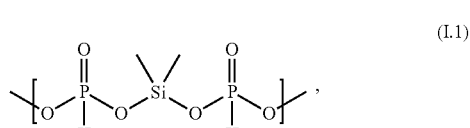
(I.1)

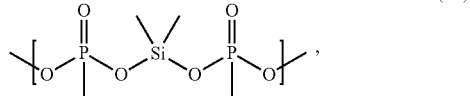
(I.2)

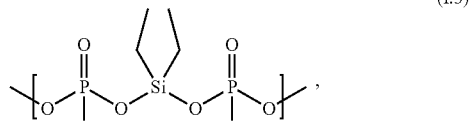
(I.3)

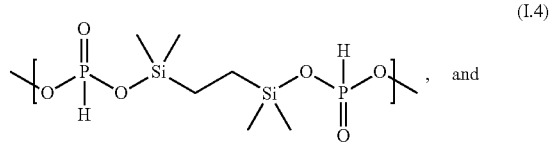
(I.4)
and

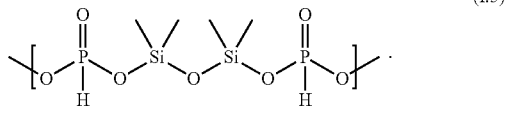
(I.5)

5. The electrolyte composition of claim 1, wherein the at least one aprotic organic solvent is selected from the group consisting of
    a fluorinated cyclic organic carbonate, a non-fluorinated cyclic organic carbonate, a fluorinated acyclic organic carbonate, and a non-fluorinated acyclic organic carbonate,
    a fluorinated ether, a non-fluorinated ether, a fluorinated polyether, a non-fluorinated polyether,
    a fluorinated cyclic ether, a non-fluorinated cyclic ether,
    a fluorinated cyclic acetal, a non-fluorinated cyclic acetal, a fluorinated cyclic ketal, a non-fluorinated cyclic ketal, a fluorinated acyclic acetal, a non-fluorinated acyclic acetal, a fluorinated acyclic ketal, a non-fluorinated acyclic ketal,
    a fluorinated orthocarboxylic acid ester, a non-fluorinated orthocarboxylic acid ester,
    a fluorinated cyclic ester of a carboxylic acid, a non-fluorinated cyclic ester of a carboxylic acid, a fluorinated cyclic diester of a carboxylic acid, a non-fluorinated cyclic diester of a carboxylic acid, a fluorinated acyclic ester of a carboxylic acid, a non-fluorinated acyclic ester of a carboxylic acid, a fluorinated acyclic diester of a carboxylic acid, a non-fluorinated acyclic diester of a carboxylic acid,
    a fluorinated cyclic sulfone, a non-fluorinated cyclic sulfone, a fluorinated acyclic sulfone, a non-fluorinated acyclic sulfone,
    a fluorinated cyclic nitrile, a non-fluorinated cyclic nitrile, a fluorinated cyclic dinitrile, a non-fluorinated cyclic dinitrile, a fluorinated acyclic nitrile, a non-fluorinated acyclic nitrile, a fluorinated acyclic dinitrile, a non-fluorinated acyclic dinitrile, a fluorinated cyclic phosphate, a non-fluorinated cyclic phosphate, a fluorinated acyclic phosphate, and a non-fluorinated acyclic phosphate.

6. The electrolyte composition of claim 1, wherein the at least one aprotic organic solvent comprises at least one solvent selected from the group consisting of a fluorinated ether, a non-fluorinated ether, a fluorinated polyether, a non-fluorinated polyether, a fluorinated cyclic organic carbonate, a non-fluorinated cyclic organic carbonate, a fluorinated acyclic organic carbonate, and a non-fluorinated acyclic organic carbonate.

7. An electrochemical cell, comprising the electrolyte composition of claim 1.

8. The electrochemical cell of claim 7, wherein the electrochemical cell is a lithium battery, a double layer capacitor, or a lithium ion capacitor.

9. The electrolyte composition of claim 1, further comprising a hydrofluoric acid scavenger, a water scavenger or combination thereof.

10. The electrolyte composition of claim 9, comprising the hydrofluoric acid scavenger, the water scavenger or combination thereof in an amount of 0.005 wt % to 25 wt % based on the total weight of the electrolyte composition.

11. A method of making an electrochemical cell, comprising:
providing an electrolyte composition along with a positive electrode and a negative electrode, wherein the electrolyte composition comprises:
a aprotic organic solvent;
a conducting salt comprising at least one lithium salt; and
a silyl ester phosphonate comprising the structure of formula (I):

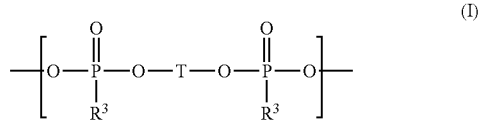

wherein:
T is selected from the group consisting of

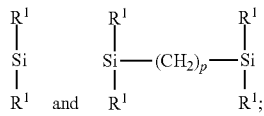

p is an integer from 0 to 6;
one or more $CH_2$ groups of $(CH_2)p$ are optionally replaced by O;
one or more H of $(CH_2)p$ are optionally replaced by $C_1$-$C_4$ alkyl;
each $R^1$ is independently selected from the group consisting of H, F, Cl, $R^4$, $OR^4$, $OSi(R^5)_3$, $OSi(OR^4)_3$, and $OP(O)(OR^4)R^5$;
each $R^4$ is independently selected from the group consisting of $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl;
each $R^4$ is independently and optionally substituted by one or more substituents selected from the group consisting of CN and F;
one or more $CH_2$-groups of alkyl, alkenyl, and alkynyl, if present in $R^4$ and not directly bound to Si or O are optionally replaced by O;
$R^3$ and $R^5$ are each independently selected from the group consisting of H, F, $C_1$-$C_{10}$ alkyl, $C_3$-$C_7$ (hetero)cycloalkyl, $C_2$-$C_{10}$ alkenyl, $C_2$-$C_{10}$ alkynyl, $C_5$-$C_7$ (hetero)aryl, and $C_6$-$C_{13}$ (hetero)aralkyl;
each optionally substituted by one or more substituents selected from the group consisting of CN and F;
one or more $CH_2$-groups of alkyl, alkenyl, and alkynyl, if present in $R^3$ and/or $R^5$ and not directly bound to P, are optionally replaced by O,
wherein the electrolyte composition comprises 0.01 to 10 wt.-% of the at least one silyl ester phosphonate based on the total weight of the electrolyte composition; and
containing the electrolyte composition in an electrochemical cell.

* * * * *